United States Patent
Roeske et al.

(10) Patent No.: US 11,593,927 B2
(45) Date of Patent: Feb. 28, 2023

(54) SYSTEM FOR THE INSPECTION OF AIR DATA PROBES

(71) Applicant: Rosemount Aerospace Inc., Burnsville, MN (US)

(72) Inventors: Cal Roeske, Eagan, MN (US); William Kunik, Lakeville, MN (US); Brian Brent Naslund, Chanhassen, MN (US); Rameshkumar Balasubramanian, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 384 days.

(21) Appl. No.: 16/946,412

(22) Filed: Jun. 19, 2020

(65) Prior Publication Data

US 2021/0398263 A1 Dec. 23, 2021

(51) Int. Cl.
*G06T 7/00* (2017.01)
*G06K 9/62* (2022.01)
(Continued)

(52) U.S. Cl.
CPC ............ *G06T 7/0002* (2013.01); *B64D 45/00* (2013.01); *G01F 1/46* (2013.01); *G01N 21/9515* (2013.01);
(Continued)

(58) Field of Classification Search
CPC ....... G06T 7/0002; G06T 7/001; B64D 45/00; B64D 43/02; B64D 2045/0085;
(Continued)

(56) References Cited

U.S. PATENT DOCUMENTS 7,609,874 B2 * 10/2009 Eswara ................... G06K 9/00
  382/152
8,171,770 B2 * 5/2012 Nugent ................ G01P 13/025
  73/1.16

(Continued)

FOREIGN PATENT DOCUMENTS

EP 3677922 A1 7/2020

OTHER PUBLICATIONS

Extended European Search Report for European Patent Application No. 21180693.0, dated Nov. 9, 2021, 10 pages.

*Primary Examiner* — Nathaniel T Woodward
*Assistant Examiner* — Philip L Cotey
(74) *Attorney, Agent, or Firm* — Kinney & Lange, P.A.

(57) ABSTRACT

A method of inspecting an air data probe for damage or misalignment on a mounting surface includes retrieving reference data for the air data probe from a database, capturing images of the air data probe via a camera and generating dimensions from the captured images of the air data probe via a feature extractor. An alignment calculator analyzes the generated dimensions from the captured images of the air data probe and the reference data for the air data probe from the database to identify misalignment of the air data probe, and analyzes the generated dimensions from the captured images of the air data probe and the reference data for the air data probe from the database to identify damage of the air data probe. A maintenance recommendation for the air data probe is generated and outputted, based on the identified misalignment or damage of the air data probe.

18 Claims, 28 Drawing Sheets

(51) Int. Cl.
| | |
|---|---|
| *B64D 45/00* | (2006.01) |
| *G01F 1/46* | (2006.01) |
| *G01P 21/02* | (2006.01) |
| *G01N 21/95* | (2006.01) |
| *G06V 10/44* | (2022.01) |
| *B64F 5/40* | (2017.01) |
| *B64D 43/02* | (2006.01) |
| *G01P 5/165* | (2006.01) |

(52) U.S. Cl.
CPC .......... *G01P 21/025* (2013.01); *G06K 9/6232* (2013.01); *G06T 7/001* (2013.01); *B64D 43/02* (2013.01); *B64D 2045/0085* (2013.01); *B64F 5/40* (2017.01); *G01P 5/165* (2013.01); *G06V 10/44* (2022.01)

(58) Field of Classification Search
CPC ..... G01F 1/46; G01N 21/9515; G01P 21/025; G01P 5/165; G06K 9/6232; B64F 5/40; G06V 10/44
See application file for complete search history.

(56) References Cited

U.S. PATENT DOCUMENTS

| | | | | |
|---|---|---|---|---|
| 9,811,954 | B2* | 11/2017 | Shanbhag | G02B 27/0179 |
| 2002/0001403 | A1* | 1/2002 | Kikuchi | G03F 7/70616 |
| | | | | 382/145 |
| 2007/0127821 | A1* | 6/2007 | Katsuyama | G06V 10/44 |
| | | | | 382/199 |
| 2009/0154293 | A1* | 6/2009 | Sengupta | F01D 21/003 |
| | | | | 367/118 |
| 2011/0052040 | A1* | 3/2011 | Kuan | G06T 7/001 |
| | | | | 382/145 |
| 2016/0327448 | A1* | 11/2016 | Cain | G01M 9/067 |
| 2018/0190132 | A1* | 7/2018 | Cronkhite | G08G 5/0013 |
| 2018/0275080 | A1* | 9/2018 | Essawy | H05B 1/0236 |
| 2018/0275085 | A1* | 9/2018 | Fok | G01N 27/20 |
| 2018/0322714 | A1* | 11/2018 | Gennotte | G07C 5/0808 |

\* cited by examiner

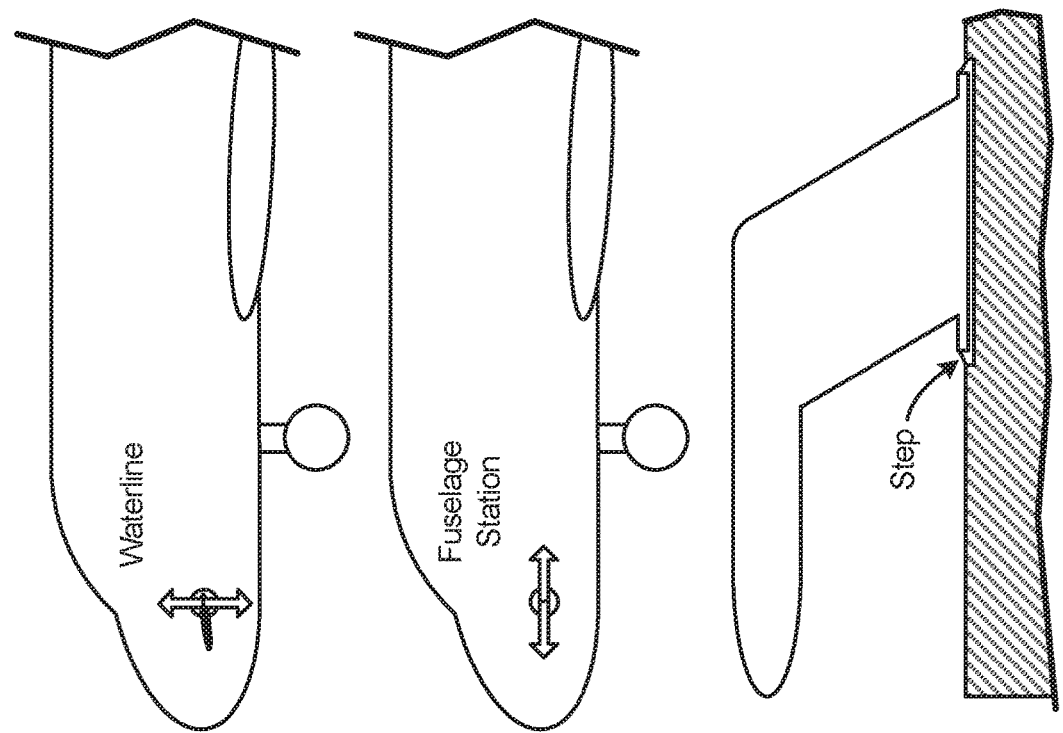
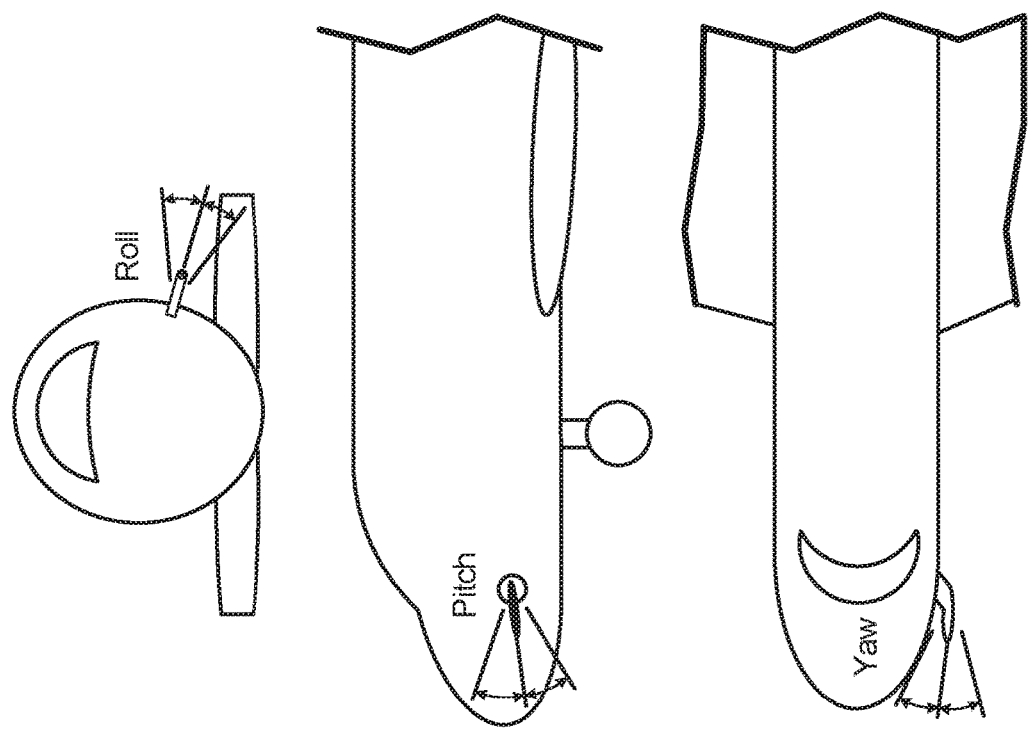
Fig. 2

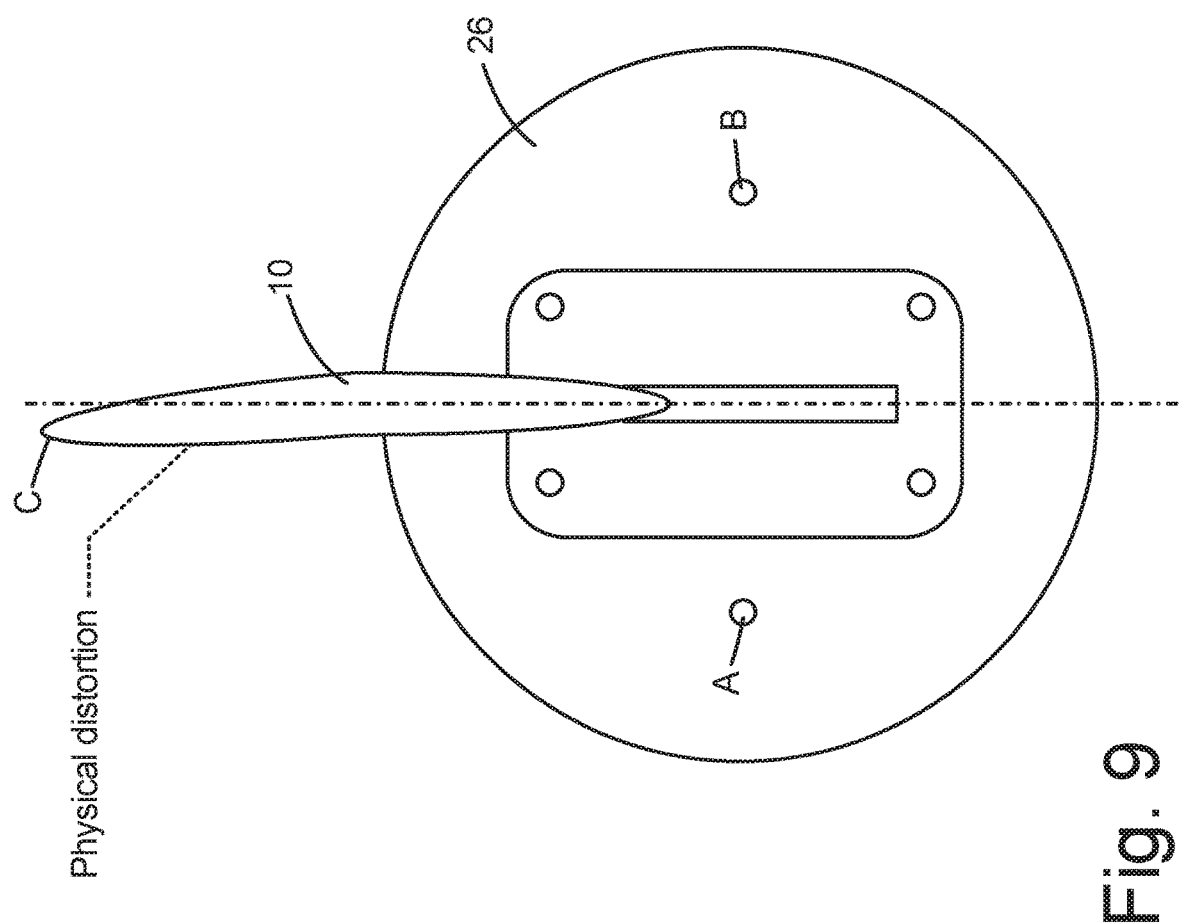

SYSTEM FOR THE INSPECTION OF AIR DATA PROBES

BACKGROUND

The present disclosure relates generally to inspection systems, and more particularly to inspection systems for air data probes.

Modern aircraft often incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as airspeed, altitude, angle of attack, angle of sideslip, or other aircraft air data parameters. Pressure measurements and/or corresponding air data parameter outputs are often compensated for aircraft aerodynamic and installation position effects to produce highly accurate air data outputs.

To achieve this high level of accuracy, the alignment of the air data probe is critical. That is, physical damage of the probe resulting from deformation (e.g., dents, dings, bends, creases, or other deformation) as well as misalignment, e.g., corrosion due to environmental exposure, can alter the flow of air across the air data probe, thereby negatively impacting accuracy of the air data parameter outputs. As such, confirmation of alignment of the air data probes is very important to ensure that the air data probes are collecting accurate data.

Traditionally, inspection of air data probes is performed via manual inspection of a technician during scheduled aircraft maintenance events. Such manual inspection may typically involve a tactile inspection of the probe for surface wear, as well as a visual comparison of the appearance of the outer surface of the probe with images included in, e.g., an aircraft maintenance manual for evidence of unacceptable corrosion. Such manual inspections, however, can often be subjective in nature, thereby resulting in customer frustration due to inconsistency of application of the acceptability criteria.

SUMMARY

In one example, a method of inspecting an air data probe for damage or misalignment on a mounting surface includes retrieving reference data for the air data probe from a database. The method further includes capturing images of the air data probe via a camera and generating dimensions from the captured images of the air data probe via a feature extractor. An alignment calculator analyzes the generated dimensions from the captured images of the air data probe and the reference data for the air data probe from the database to identify misalignment of the air data probe. The alignment calculator also analyzes the generated dimensions from the captured images of the air data probe and the reference data for the air data probe from the database to identify damage of the air data probe. A maintenance recommendation for the air data probe is generated, based on the identified misalignment of the air data probe, or the identified damage of the air data probe. The method further includes outputting the maintenance recommendation.

In another example, a method of inspecting an air data probe for damage or misalignment on a mounting surface includes retrieving reference data for the air data probe from a database, capturing images of the air data probe via a camera, and generating dimensions from the captured images of the air data probe via the feature extractor. The method further includes, comparing with an alignment calculator the generated dimensions from the captured images of the air data probe and the reference data for the air data probe from the database to identify misalignment of the air data probe. The alignment calculator compares the generated dimensions from the captured images of the air data probe and the reference data for the air data probe from the database to identify damage of the air data probe. A maintenance recommendation is generated based on the identified misalignment of the air data probe, or the identified damage of the air data probe, and the maintenance recommendation is outputted.

In another example, a system for inspecting an air data probe for physical damage or misalignment on a mounting surface includes an image sensor, a display device, one or more processors, and computer-readable memory. The computer-readable memory is encoded with instructions that, when executed by the one or more processors, cause the system to retrieve reference data for the air data probe from a database, retrieve reference data for the air data probe from a database, and capture images of the air data probe via the image sensor. The instructions further cause the system to generate dimensions from the captured images of the air data probe via a feature extractor. An alignment calculator compares the generated dimensions from the captured images of the air data probe and the reference data for the air data probe from the database to identify misalignment of the air data probe on the mounting surface. The instructions further cause the system to compare with the alignment calculator the generated dimensions from the captured images of the air data probe and the reference data for the air data probe from the database to identify damage of the air data probe. The system generates, based on the identified misalignment of the air data probe, or the identified damage of the air data probe a maintenance recommendation for the air data probe, and output the maintenance recommendation onto the display.

BRIEF DESCRIPTION OF THE DRAWINGS

FIG. 2 is an illustration of possible misalignments of an air data probe.

FIG. 9 is an illustration of an inspection of an air data probe with physical damage.

DETAILED DESCRIPTION

As described herein, a system for inspecting an air data probe utilizes image-based and video-based analysis techniques to identify misalignment of the air data probe and physical damage of the air data probe. A technician captures images of the air data probe from multiple orientations around the air data probe. The captured images are first analyzed via image processing techniques to detect and identify the air data probe. Once the air data probe is identified, the system determines whether the air data probe installed is a correct model of the air data probe for the airplane model provided. If the installed air data probe is not compatible with the airplane on which the air data probe is installed, the system can display an incorrect air data probe warning.

The captured images are then analyzed via image processing techniques to identify misalignment of the air data probe or damage to the air data probe. In some examples, multiple images or video images are utilized to capture a more accurate understanding of the position of the air data probe. The system can produce a maintenance recommendation for the probe based on the image analysis, such as a recommendation for further inspection, a recommendation for removal of the probe, a recommendation for repair of the probe, or a recommendation for replacement of the probe. Accordingly, the system described herein can provide a maintenance recommendation for an air data probe that is based on image-based or video-based analysis techniques, thereby increasing uniformity of the application of air data probe misalignment or damage criteria. Furthermore, the system can include an augmented display eyewear device, which wirelessly communicates with the system and displays the maintenance recommendation on the augmented display of the augmented display eyewear device.

Figure 1:
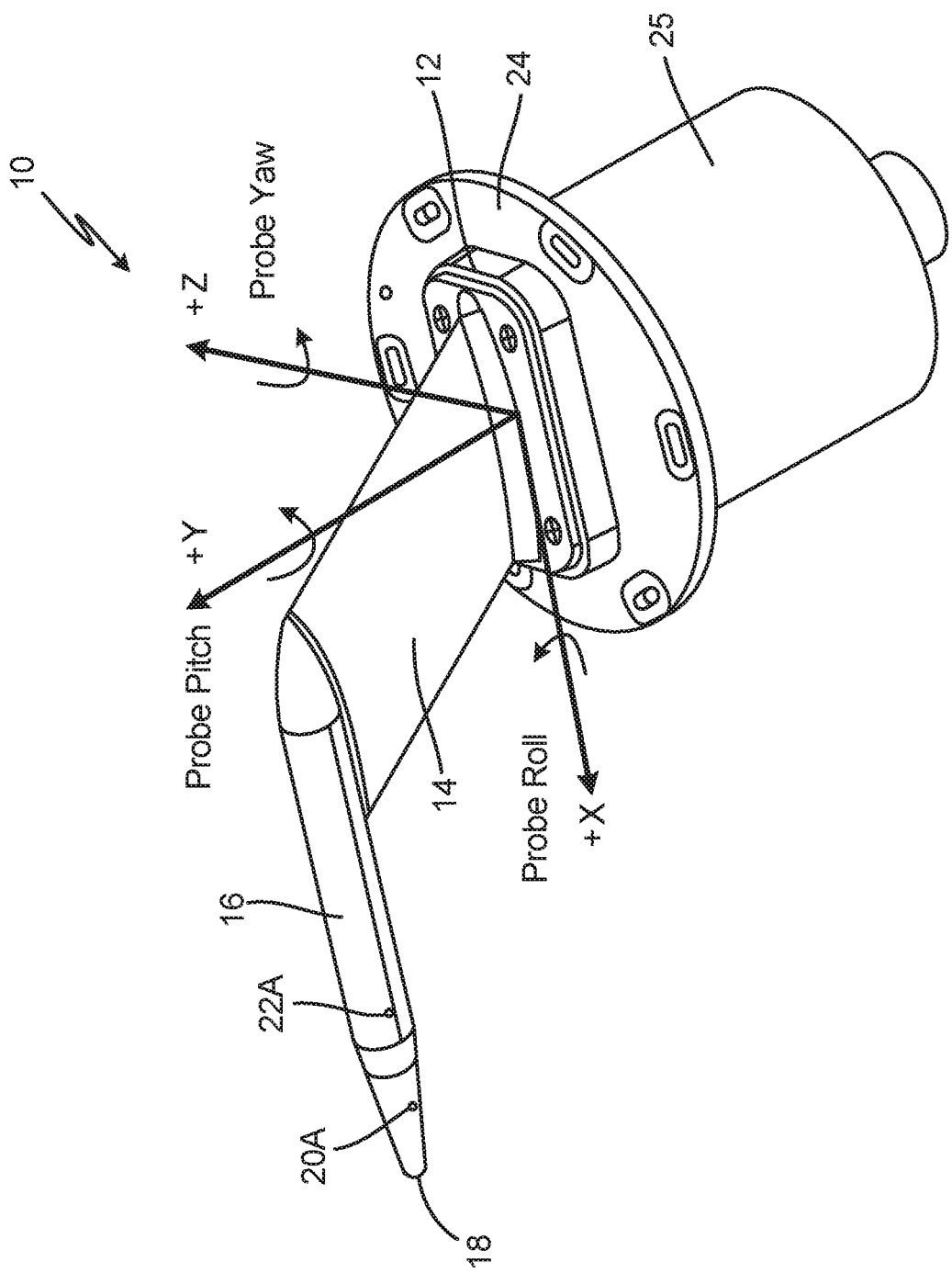
FIG. 1 is a perspective view of an air data probe.

FIG. 1 is a perspective view of air data probe 10. Air data probe 10 is a multi-function air data probe that combines one or more air data measurements into a single line-replaceable unit (LRU), or other air data probe. having base plate 12, strut 14, barrel portion 16, an X-axis, a Y-axis, and a Z-axis. Barrel portion 16 includes pitot pressure port 18 at a forward tip of barrel portion 16, static pressure port 20A aft of the tip, and static pressure port 22A aft of static pressure port 20A. Though not illustrated in FIG. 1, barrel portion 16 also includes a third static pressure port opposite static pressure port 20A and a fourth static pressure port opposite static pressure port 22A.

Base plate 12 is configured to mount air data probe 10 to an exterior of an aircraft via mounting surface 24, such that barrel portion 16 extends, via strut 14, into an oncoming airflow about the exterior of the aircraft. Pitot pressure port 18 is pneumatically connected to a pressure sensor, such as within electronics housing 25, to measure a pitot (or total) pressure of the oncoming airflow. Each of static pressure ports 20A and 22A (as well as static pressure ports opposite ports 20A and 22A) are connected to pressure sensors (e.g., within electronics housing 25) to measure static pressure of the oncoming airflow, for altitude and angle of attack measurements. Measured pitot and static pressures from air data probe 10 are utilized by an air data system or other consuming system for generation of aircraft air data parameters, such as airspeed, altitude, angle of attack, angle of sideslip, or other air data parameters. Though air data probe 10 is illustrated and described herein as a multi-function probe, aspects of this disclosure are not so limited. For instance, air data probe 10 can be a pitot-static probe, a pitot probe (e.g., without including static pressure ports) or any other air data probe configured to be mounted to an exterior of an aircraft and exposed to exterior environmental conditions during operation of the aircraft, such as a total air temperature (TAT) probe, an angle of attack vane, a flush static pressure port, Mounting surface 24 attaches air data probe 10 to the aircraft. Mounting surface 24 is configured to allow adjustments to the placement of air data probe through adjustments of the fasteners that couple mounting surface 24 to the aircraft. Unintentional movements of mounting surface 24 in relation to the aircraft are the most common cause of misalignment for air data probe 10. To realign air data probe 10, the operator or maintenance person will loosen the fasteners between mounting surface 24 and the aircraft, then make the suggested adjustments, and then tighten the fasteners.

Electronics housing 25 extends below mounting surface 24 away from base plate 12. When mounting surface 24 is mounted on an aircraft, electronics housing 25 can extend into the aircraft to provide protection for electrical components and sensor wires of air data probe 10. Furthermore, electronics housing 25 can form mounting surface 24 that connects to base plate 12 of air data probe 10.

FIG. 2 is an illustration showing possible misalignments of air data probe 10. As discussed above, alignment of air data probe 10 is critical to ensure that air data probe 10 measures both accurate and precise readings. Accurate and precise measurements from air data probe 10 are essential to obtain accurate environmental aircraft air data information for the systems of an aircraft. Slight misalignments result in errors in the data collected by air data probe 10. Air data probe 10 can be misaligned in at least the following ways.

First, air data probe 10 can have roll misalignment. Roll misalignment occurs when air data probe 10 rotates about the X-axis. Next, air data probe 10 can have pitch misalignment. Pitch misalignment occurs when air data probe 10 rotates about the Y-axis. Third, air data probe 10 can have yaw misalignment. Yaw misalignment occurs when air data probe 10 rotates about the Z-axis. Next, air data probe 10 can have waterline misalignment. Waterline misalignment occurs when air data probe 10 moves along the Z-axis. Next, air data probe 10 can have fuselage station misalignment. Fuselage station misalignment occurs when air data probe 10 moves along the X-axis. Lastly, air data probe 10 can have step misalignment. Step misalignment is when air data probe moves along the Y-axis.

Each of these misalignments generates error in the data collected by air data probe 10. Therefore, a system to verify alignment of air data probe 10 is crucial to ensure that the data collected by air data probe 10 is accurate and precise. Furthermore, air data probe 10 can have a combination of each of the aforementioned misalignments. A system to detect misalignment and damage to air data probe 10 is discussed with reference to FIGS. 3-20 below.

Figure 3:
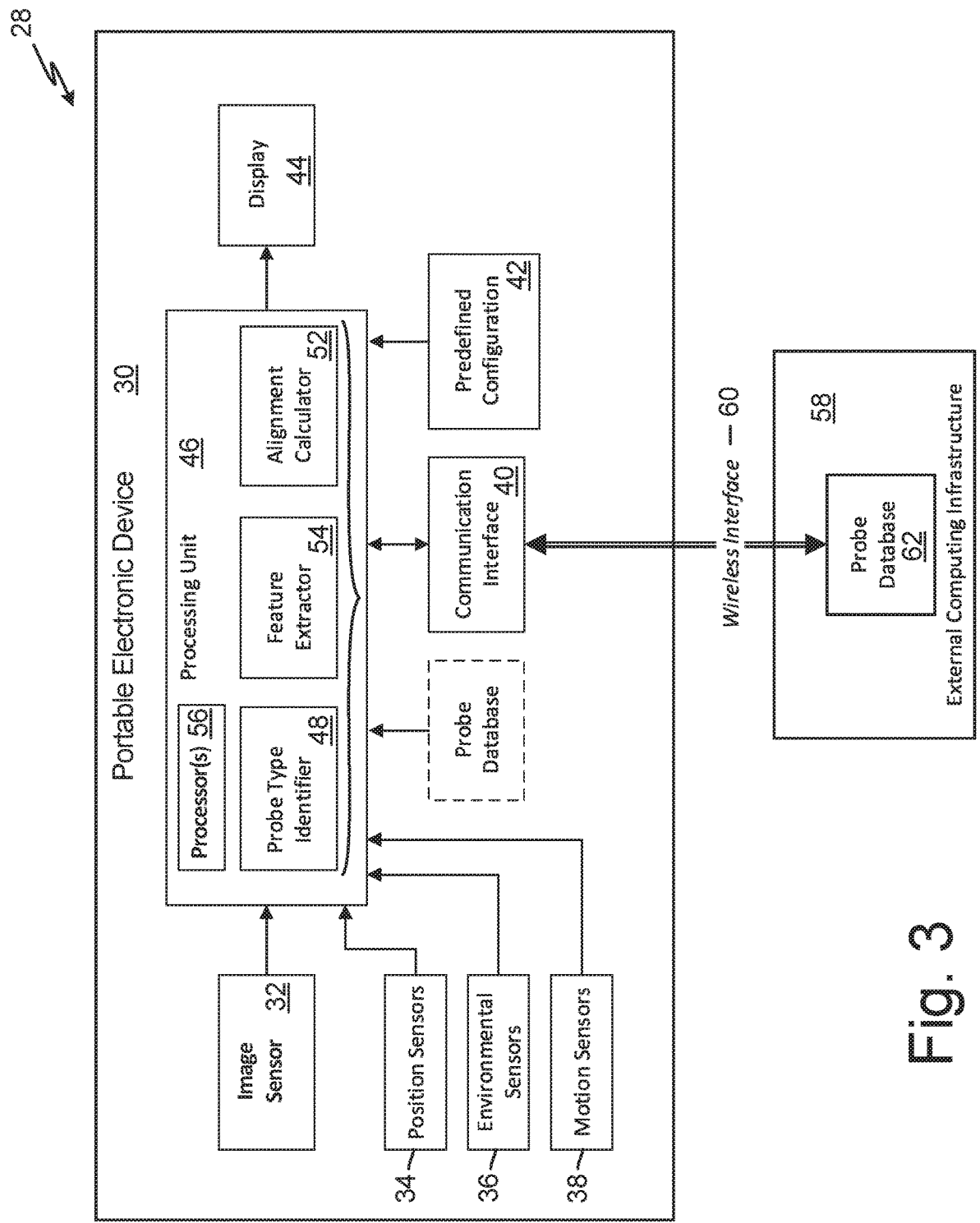
FIG. 3 is a schematic of the architecture of a portable electronic device used to inspect the air data probe of FIG. 1.

FIG. 3 is a schematic showing the architecture of system 28 used to inspect air data probe 10. System 28 includes handheld portable electronic device, or portable electronic device 30, external computing infrastructure 58, and wireless interface 60. Portable electronic device 30 includes image sensor 32, position sensors 34, environmental sensors 36, motion sensors 38, communication interface 40, predefined configuration 42, display 44, processing unit 46, and computer-readable memory 54. Processing unit 46 includes probe type identifier 48, feature extractor 50, alignment calculator 52, and processor(s) 56. External computing infrastructure 58 includes probe database 62.

Examples of portable electronic device 30 include electronic devices, such as a smartphone, a tablet computer, a digital camera, or other devices having a camera and integrated display. In other examples, one or more components of portable electronic device 30 can be distributed among multiple devices that are operatively connected (e.g., communicatively and/or electrically connected) to operate in accordance with techniques attributed herein to portable electronic device 30. For instance, portable electronic device 30 can take the form of a camera device that is operatively connected to a separate display device.

Image sensor 32 includes optical and electrical components, such as one or more lenses and image sensors configured to capture still and/or moving images within a field of view of image sensor 32. Image sensor 32 can be the camera of portable electronic device 30. Position sensors 34 (e.g., orientation sensors, magnetometer sensor, etc.), environmental sensors 36 (e.g., ambient light sensors, ambient temperature sensors, etc.), and motion sensors 38 (e.g., accelerometers, gyroscope, etc.), are sensors internal to portable electronic device 30 used to determine the orientation of the device while image sensor 32 captures images. Each of position sensor 34, environmental sensors 36, and motion sensors 38 communicate with processing unit 46, and in particular, alignment calculator 52.

Processing unit 46 includes one or more processor(s) 56. Each of processor(s) 56 can be configured to implement functionality and/or process instructions for execution within portable electronic device 30. For instance, processor(s) 56 can be capable of processing instructions stored in computer-readable memory 54, such as to execute software or other applications encoded as instructions stored in computer-readable memory 54 (e.g., predefined configuration 42, probe type identifier 48, feature extractor 50, and/or alignment calculator 52). Examples of processor(s) 56 include any one or more of a microprocessor, a digital signal processor (DSP), an application specific integrated circuit (ASIC), a field-programmable gate array (FPGA), or other equivalent discrete or integrated logic circuitry.

Predefined configuration 42 is a module stored within portable electronic device 30. Predefined configuration 42 contains all the initial startup information of system 28. Furthermore, predefined configuration 42 contains all configurable parameters related to air data probe 10. Lastly, predefined configuration 42 contains instructions and access information which enables portable electronic device 30 to connect to external computing infrastructure 58 via wireless interface 60.

Probe type identifier 48 is a module stored within processing unit 46 of portable electronic device 30. Probe type identifier 48 enables the identification of type of air data probe 10 installed on the aircraft. Feature extractor 50 is a module stored within processing unit 46 of portable electronic device 30. Feature extractor 50 can identify specific points on air data probe 10 and generates dimensions used in the calculations to determine misalignment or damage of air data probe 10. Alignment calculator 52 is a module stored within processing unit 46 of portable electronic device 30. Alignment calculator 52 is capable of translating the dimensions generated from feature extractor 50, and incorporating the inputs from each of image sensor 32, position sensors 34, environmental sensors 36, motion sensors 38, and probe database 62 to compute the alignment error or detect damage to air data probe 10.

Portable electronic device 30 communicates with external computing infrastructure 54 via wireless interface 56. Wireless interface 56 can be a network interface card, such as an Ethernet card, an optical transceiver, a radio frequency transceiver, a Bluetooth, 3G, 4G, 5G, Long-Term-Evolution (LTE), or Wi-Fi transceiver, or any other type of device that can send and receive wired and/or wireless data.

In the aspect of the disclosure shown in FIG. 3, probe database 62 is included within external computing infrastructure 58. Probe database 62 stores information associating identifiers of air data probes (e.g., probe model numbers, aircraft type, or other identifiers of air data probes) with physical dimensions of a plurality of air data probes according to the identifiers. Probe database 62 can be, e.g., a relational database, a hierarchical database, an object-oriented database, a multi-dimensional database, or other type of physical or virtual data store configured to organize data for later retrieval. In other aspects of the disclosure, external computing infrastructure 58 can include processing unit 46 including probe type identifier 48, feature extractor 50, and/or alignment calculator 52. In another aspect of the disclosure, probe database 62 can be stored on portable electronic device 30.

Display 44 can be a liquid crystal display (LCD), a light emitting diode (LED) display, an organic light emitting diode (OLED) display, an active matrix organic light emitting diode (AMOLED) display, or other type of display device capable of displaying graphical information to a user. In some examples, display 44 is a touch-sensitive display configured to present a graphical user interface (GUI) having one or more graphical control elements and to receive user input in the form of gestures to enable a user to interact with system 28.

Figure 4:
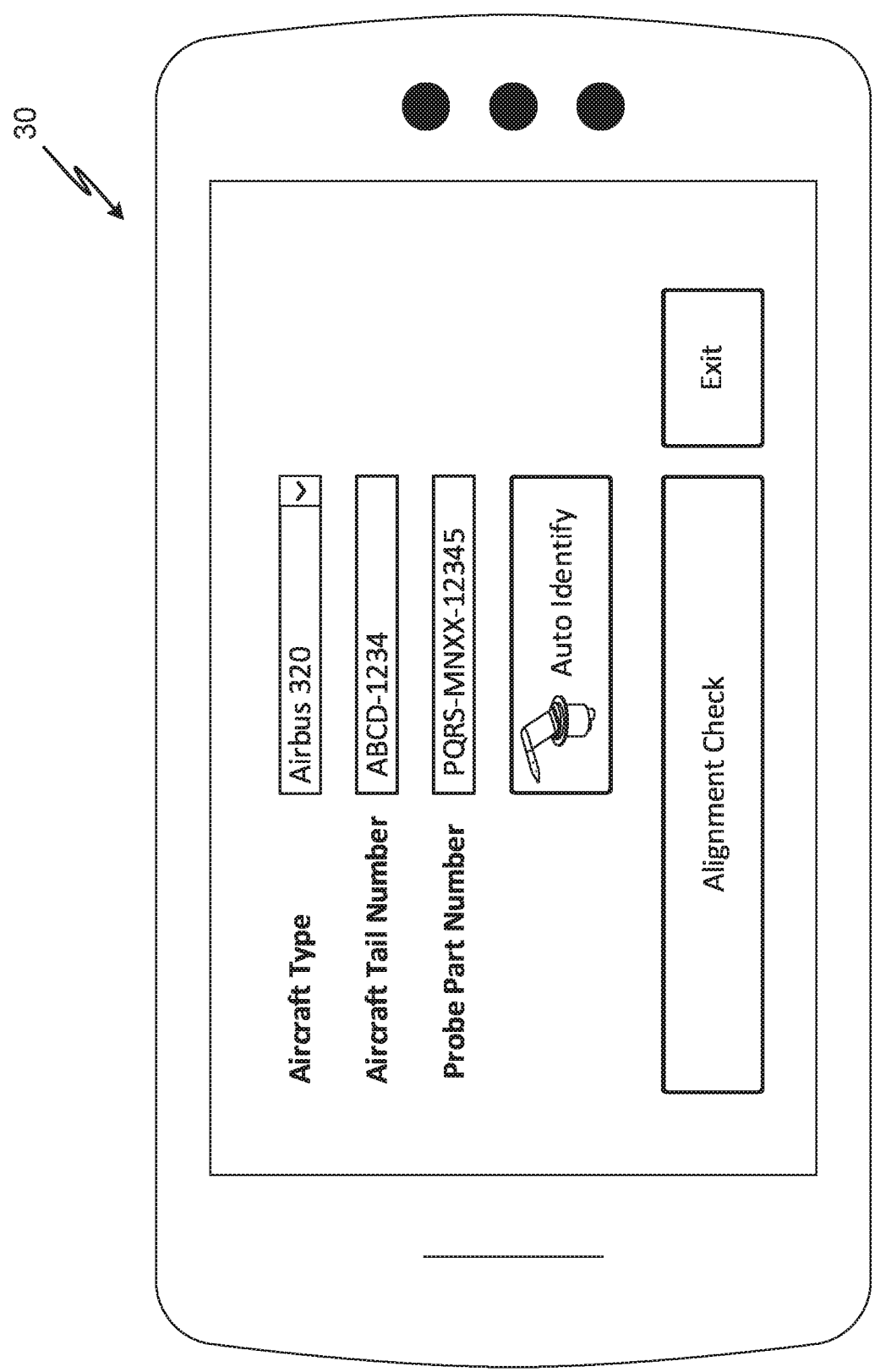
FIG. 4 is an illustration view of the graphical user interface shown on the portable electronic device.

FIG. 4 is an illustration of the graphical user interface on portable electronic device 30. The graphical user interface as shown in FIG. 4 allows the user to enter the aircraft type, aircraft tail number, and the probe part number. Additionally, the user has the option to "auto-identify" the air data probe type, which would run probe type identifier 48. Once all information is entered or gathered into the graphical user interface, the operator can choose "alignment check," which would run feature extractor 50 and alignment calculator 52. Lastly, the graphical user interface provides the user the option to "exit," which will bring the user back to the main screen. Once the user selects "alignment check" the graphical user interface will guide the user in capturing images of the air data probe.

Figure 5:
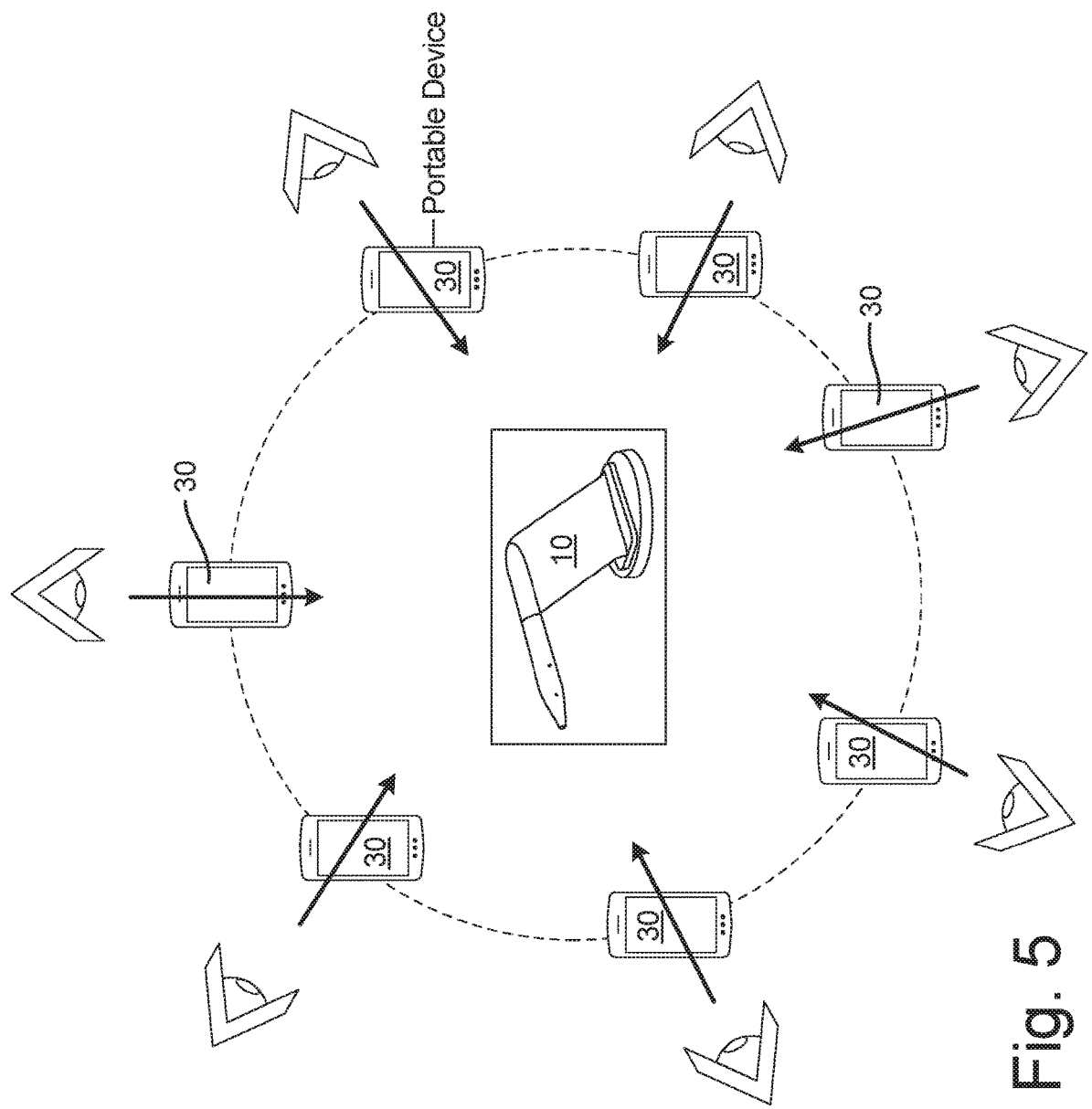
FIG. 5 is an illustration view of the directions from which images of an air data probe can be captured.

FIG. 5 is an illustration of the directions from which images of air data probe 10 can be captured. The more images provided to system 28 the more accurately system 28 can calculate the misalignments and damage to air data probe 10. The orientations shown in FIG. 5 are merely a suggested number of orientations from which air data probe 10 can be viewed. Each of these orientations can be viewed from a single image sensor 32 or can be taken by a plurality of image sensors 32. In the example shown in FIG. 5, seven orientations around air data probe 10 are shown. In another example, system 28 can analyze the quality of the images collected, to determine when enough images have been collected to accurately measure the damage or misalignment of air data probe 10. In another example of the disclosure, portable electronic device 30 can capture a video image of air data probe 10. When portable electronic device 30 captures a video image of air data probe 10, portable electronic device 30 can capture the video image in one pass around air data probe 10 from each of the orientations as shown in FIG. 5.

Figure 6B:
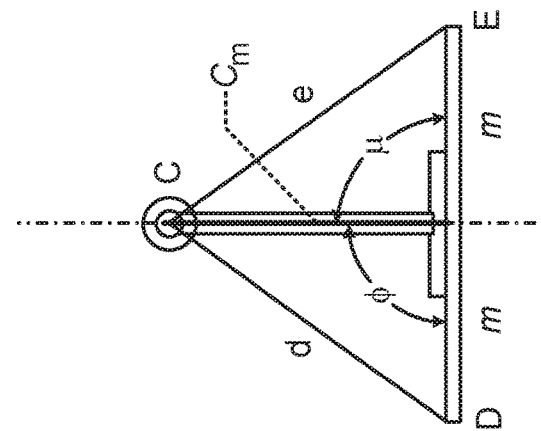
FIG. 6B is an illustration of a front view of measurements of an air data probe found by the feature extractor.
Figure 6C:
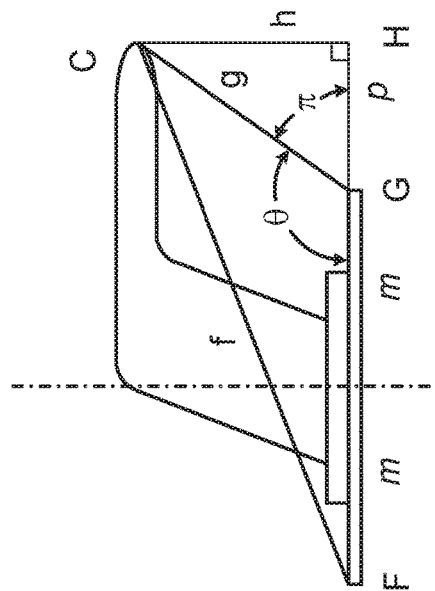
FIG. 6C is an illustration of a side view of measurements of an air data probe found by the feature extractor.
Figure 6A:
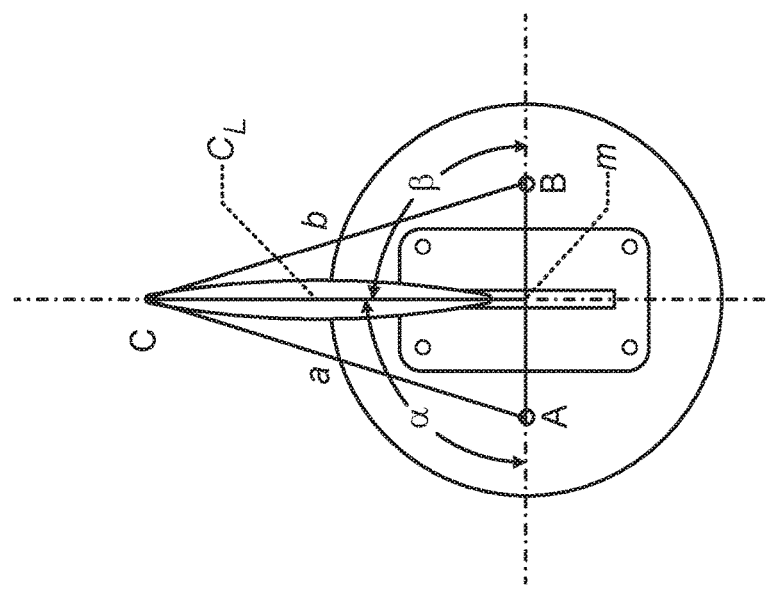
FIG. 6A is an illustration of a top view of measurements of an air data probe found by a feature extractor.

FIGS. 6A-6C will be discussed concurrently. FIG. 6A is an illustration showing the top view of air data probe 10 with measurements found by feature extractor 50. FIG. 6B is an illustration showing the front view of the measurements of air data probe 10 found by feature extractor 50. FIG. 6C is an illustration showing the side view of the measurements of air data probe 10 found by feature extractor 50. Feature extractor 50 can identify specific points on air data probe 10 and generates dimensions used in the calculations to determine misalignment or damage of air data probe 10. As shown in FIGS. 6A-6C, feature extractor 50 identifies different points on air data probe depending on the orientation from which the image is taken.

For the top view as shown in FIG. 6A, feature extractor 50 identifies two defined points on mounting surface 24, data point A and data point B. Data point A is on an opposite side of air data probe 10 from data point B. Next, feature extractor 50 identifies data point C at the forward tip of barrel portion 16 of air data probe 10. Once data point A, data point B, and data point C are identified and labeled, feature extractor 50 determines the line a, or the line between data point A and data point C, line b, or the line between data point B and data point C, and line $C_L$, or the distance between data point C and the mid-point between data point A and data point B. Next, data extractor 50 calculates angle α by determining the angle between line $C_L$ and data point A side of the horizontal line connecting data point A and data point B. Then, data extractor 50 calculates angle β by determining the angle between line $C_L$ and data point B side of the horizontal line connecting data point A and data point B.

For the front or back view as shown in FIG. 6B, feature extractor 50 identifies two defined points on mounting surface 24, data point D and data point E. Data point D is on an opposite side of air data probe 10 from data point E. Next, feature extractor 50 identifies data point C at the forward tip of barrel portion 16 of air data probe 10. Once data point D, data point E, and data point C are identified and labeled, feature extractor 50 determines the line d, or the line between data point D and data point C, line e, or the line between data point E and data point C, and line $C_M$, or the distance between the mid-point between data point D and data point E and data point C. Next, data extractor 50 calculates angle φ by determining the angle between line $C_M$ and data point D side of the horizontal line connecting data point D and data point E. Then, data extractor 50 calculates angle μ by determining the angle between line $C_M$ and data point E side of the horizontal line connecting data point D and data point E.

For the side view as shown in FIG. 6C, feature extractor 50 identifies two defined points on mounting surface 24, data point F and data point G. Data point F is on an opposite end of the base plate of air data probe 10 from data point G. Next, feature extractor 50 identifies data point C at the forward tip of barrel portion 16 of air data probe 10. Data point H is the point that makes a 90-degree angle between data point B and data point C. Once data point F, data point G, and data point C are identified and labeled, feature extractor 50 determines the line f, or the line between data point F and data point C, line g, or the line between data point G and data point C, and line m, or the distance from either data point F or data point G to the middle-point between data point F and data point G. Furthermore, feature extractor measures line p, which extends from data point G and data point H. Line h extends between data point C and data point H. Lastly, feature extractor 50 measures angle θ and angle π. Angle θ is the angle between line g and line m, between the mid-point of data point F and data point G. Angle π is the angle between line p and line g.

Probe database 62 contains each of the above data points, lines, and angles, for each different model of air data probe 10. The dimensions stored in probe data base 62 are the "normal" or "control" dimensions that are used by alignment calculator 52 as reference data. Alignment calculator 52 compares the dimensions stored in probe database 62 and the dimensions measured by feature extractor 50.

Figure 7A:
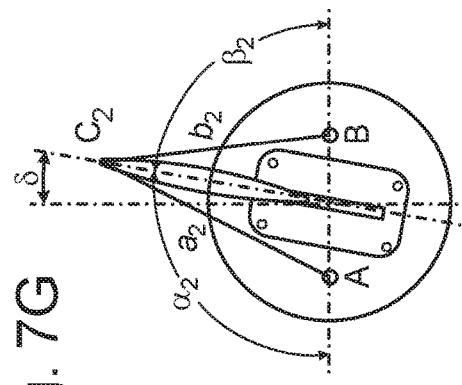
FIG. 7A is an illustration of a top view an air data probe with proper pitch alignment.
Figure 7B:
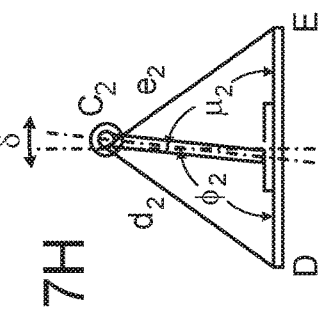
FIG. 7B is an illustration of a front view of an air data probe with proper roll alignment.
Figure 7C:
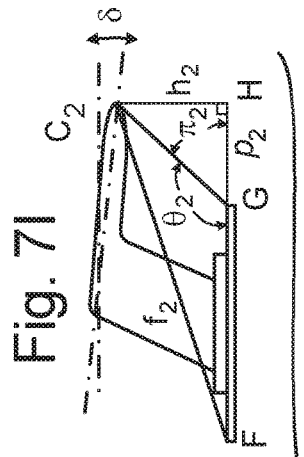
FIG. 7C is an illustration of a side view of an air data probe with proper yaw alignment.
Figure 7D:
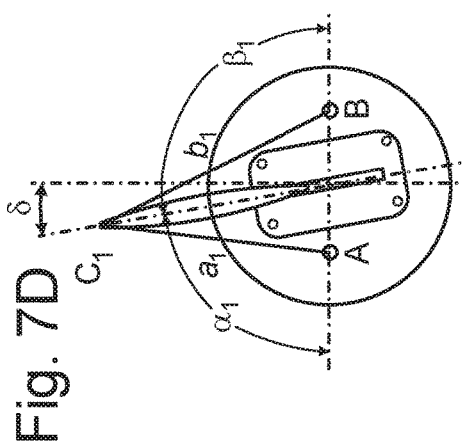
FIG. 7D is an illustration of a top view of an air data probe with pitch misalignment.
Figure 7E:
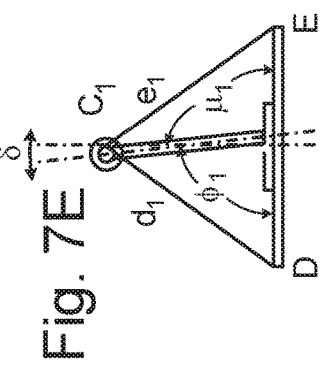
FIG. 7E is an illustration of a front view of an air data probe with roll misalignment.
Figure 7F:
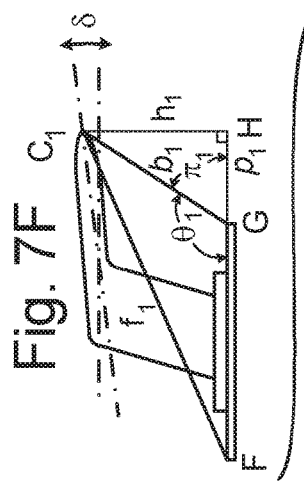
FIG. 7F is an illustration of a side view of an air data probe with yaw misalignment.
Figure 7G:
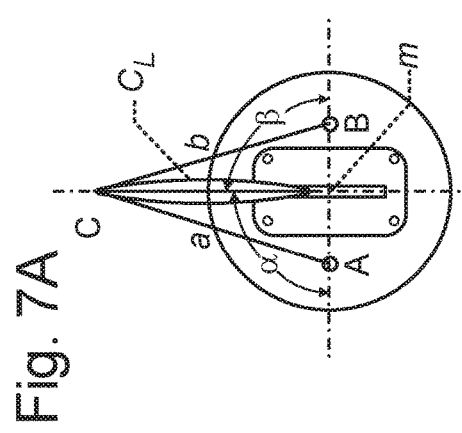
FIG. 7G is an illustration of a top view of an air data probe with pitch misalignment.
Figure 7H:
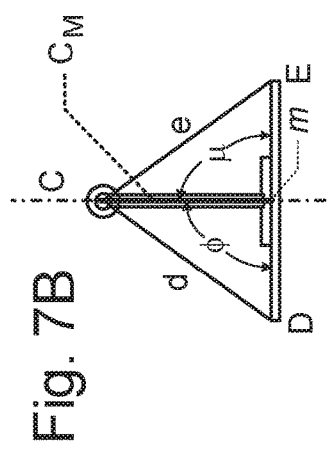
FIG. 7H is an illustration of a front view of an air data probe with roll misalignment.
Figure 7I:
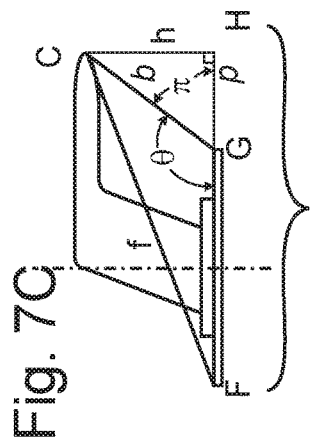
FIG. 7I is an illustration of a side view of an air data probe with yaw misalignment.

FIGS. 7A-7I will be discussed concurrently. FIG. 7A is an illustration of a top view of air data probe 10 with proper alignment. FIG. 7B is an illustration of a front view of air data probe 10 with proper alignment. FIG. 7C is an illustration of a side view of air data probe 10 with proper alignment. FIG. 7D is an illustration of a top view of air data probe 10 with pitch misalignment. FIG. 7E is an illustration of a front view of air data probe 10 with roll misalignment. FIG. 7F is an illustration of a side view of air data probe 10 with yaw misalignment. FIG. 7G is another illustration of a top view of air data probe 10 with pitch misalignment. FIG. 7H is another illustration of a front view of air data probe 10 with roll misalignment. FIG. 7I is another illustration of a side view of air data probe 10 with yaw misalignment.

FIGS. 7A-7C are each illustrations of the dimensions of air data probe 10 as stored in probe database 62, and FIGS. 7D-7I are illustrations of air data probe 10 with various misalignments calculated by system 28. First, image sensor 32 captures images (such as FIGS. 7D-7I) of air data probe 10. Next, feature extractor 50 analyzes the captured images of air data probe 10. Then, alignment calculator 52 compares the dimensions measured by feature extractor 50 to the dimensions in probe database 62 as shown in FIGS. 7A-7C to calculate misalignment 6. Each of the misalignments shown in FIGS. 7D-7I are misalignments caused by air data probe rotating about an axis. After misalignment 6 has been calculated, misalignment 6 is used by system 28 to generate maintenance recommendations for returning air data probe 10 to proper alignment.

Figure 8A:
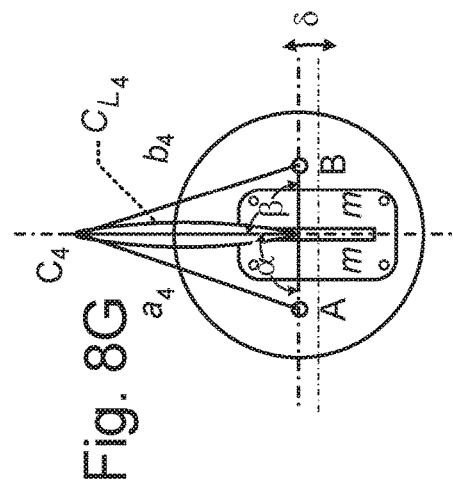
FIG. 8A is an illustration of a top view of an air data probe with proper alignment.
Figure 8B:
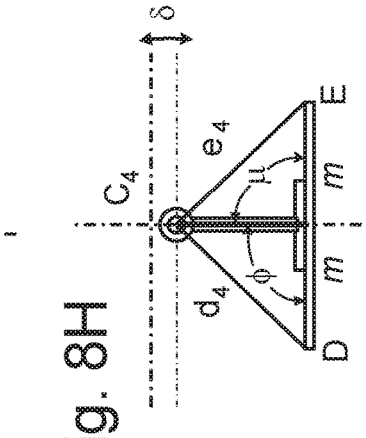
FIG. 8B is an illustration of a front view of an air data probe with proper alignment.
Figure 8C:
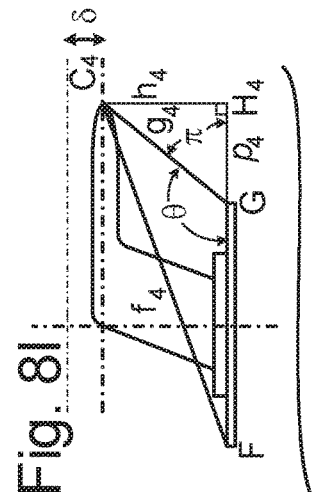
FIG. 8C is an illustration of a side view of an air data probe with proper alignment.
Figure 8D:
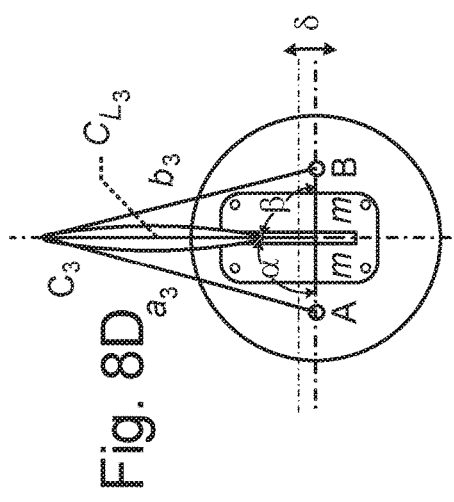
FIG. 8D is an illustration of a top view of an air data probe with fuselage station misalignment.
Figure 8E:
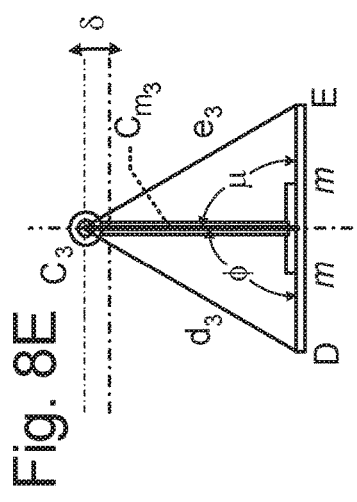
FIG. 8E is an illustration of a front view of an air data probe with fuselage step misalignment.
Figure 8F:
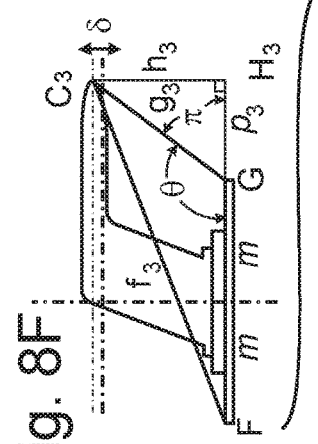
FIG. 8F is an illustration of a side view of an air data probe with step misalignment.
Figure 8G:
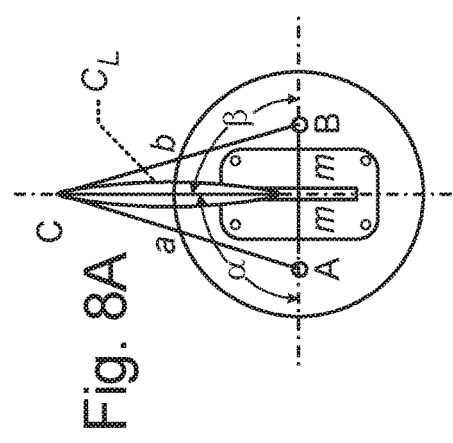
FIG. 8G is an illustration of a top view of an air data probe with fuselage station misalignment.
Figure 8H:
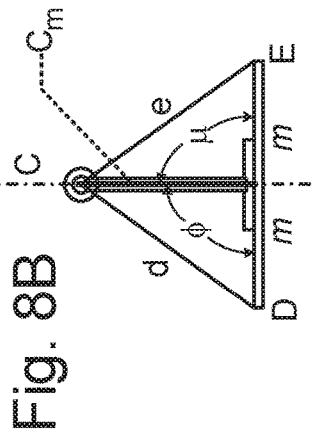
FIG. 8H is an illustration of a front view of an air data probe with step misalignment.
Figure 8I:
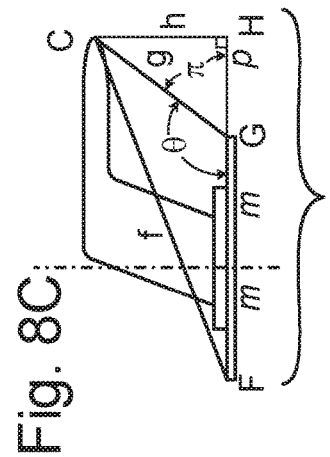
FIG. 8I is an illustration of a side view of an air data probe with step misalignment.
Figure 8M:
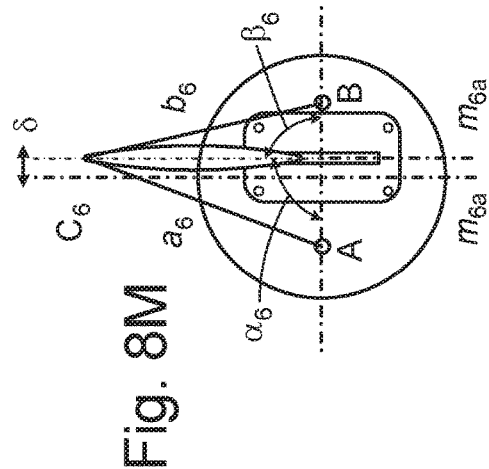
FIG. 8M is an illustration of a top view of an air data probe with waterline misalignment.
Figure 8N:
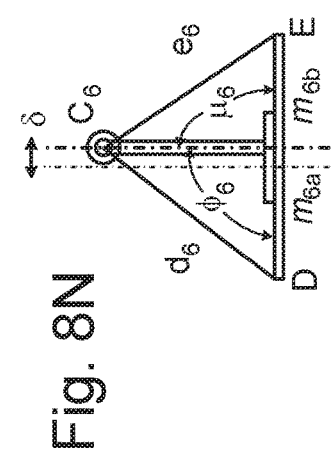
FIG. 8N is an illustration of a front view of an air data probe with waterline misalignment.
Figure 8O:
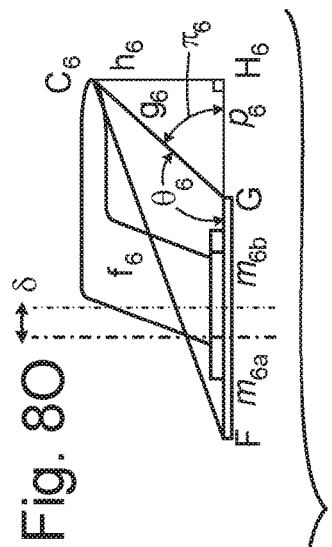
FIG. 8O is an illustration of a side view of an air data probe with fuselage station misalignment.
Figure 8J:
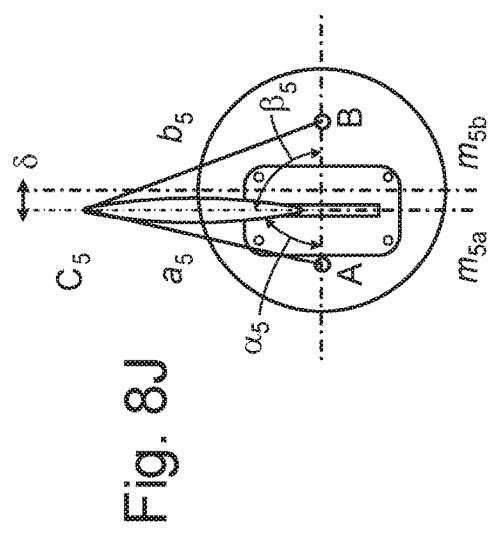
FIG. 8J is an illustration of a top view of an air data probe with waterline misalignment.
Figure 8K:
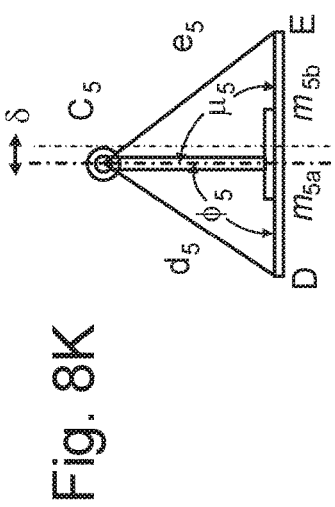
FIG. 8K is an illustration of a front view of an air data probe with waterline misalignment.
Figure 8L:
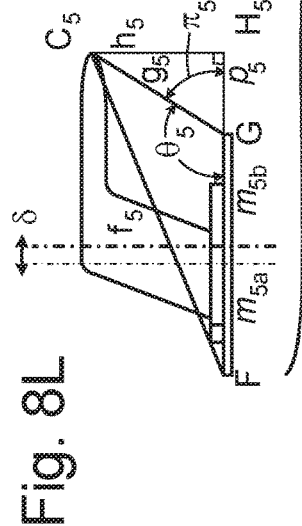
FIG. 8L is an illustration of a side view of an air data probe with fuselage station misalignment.

FIGS. 8A-8O will be discussed concurrently. FIG. 8A is an illustration of a top view of air data probe 10 with proper alignment. FIG. 8B is an illustration of a front view of air data probe 10 with proper alignment. FIG. 8C is an illustration of a side view of air data probe 10 with proper alignment. FIG. 8D is an illustration of a top view of air data probe 10 with fuselage station misalignment. FIG. 8E is an illustration of a front view of air data probe 10 with step misalignment. FIG. 8F is an illustration of a side view of air data probe 10 with step misalignment. FIG. 8G is an illustration of a top view of air data probe 10 with fuselage station misalignment. FIG. 8H is an illustration of a front view of air data probe 10 with step misalignment. FIG. 8I is an illustration of a side view of air data probe 10 with step misalignment. FIG. 8J is an illustration of a top view of air data probe 10 with waterline misalignment. FIG. 8K is an illustration of a front view of air data probe 10 with waterline misalignment. FIG. 8L is an illustration of a side view of air data probe 10 with fuselage station misalignment. FIG. 8M is an illustration of a top view of air data probe 10 with waterline misalignment. FIG. 8N is an illustration of a front view of air data probe 10 with waterline misalignment. FIG. 8O is an illustration of a side view of air data probe 10 with fuselage station misalignment.

FIGS. 8A-8C are each illustrations of air data probe 10 as stored in probe database 62, and FIGS. 8D-8O are illustrations of air data probe 10 with various misalignments calculated by system 28. First, image sensor 32 capture images of air data probe 10. Next, feature extractor 50 analyzes the captured images of air data probe 10. Then, alignment calculator 52 compares the dimensions measured by feature extractor 50 to the dimensions in probe database 62 as shown in column 1 to calculate misalignment 6. Each of the misalignments shown in FIGS. 8D-8O are misalignments caused by air data probe moving along an axis. After misalignment 6 has been calculated, misalignment 6 is used by system 28 to generate maintenance recommendations for returning air data probe 10 to proper alignment.

FIG. 9 is an illustration of a top view of air data probe 10 with physical damage. In addition to misalignment, where air data probe 10 has rotated or moved along an axis in relation to mounting surface 24, air data probe 10 can become damaged. Similar to when air data probe 10 is misaligned, damage to air data probe 10 negatively affects the accuracy and precision of the readings produced from air data probe 10. Through the same process as described above, system 28 can detect damage to air data probe 10. System recognizes that air data probe 10 is damaged when data point A and data point B are each aligned properly with mounting surface 24, and data point C is not properly aligned.

Figure 10:
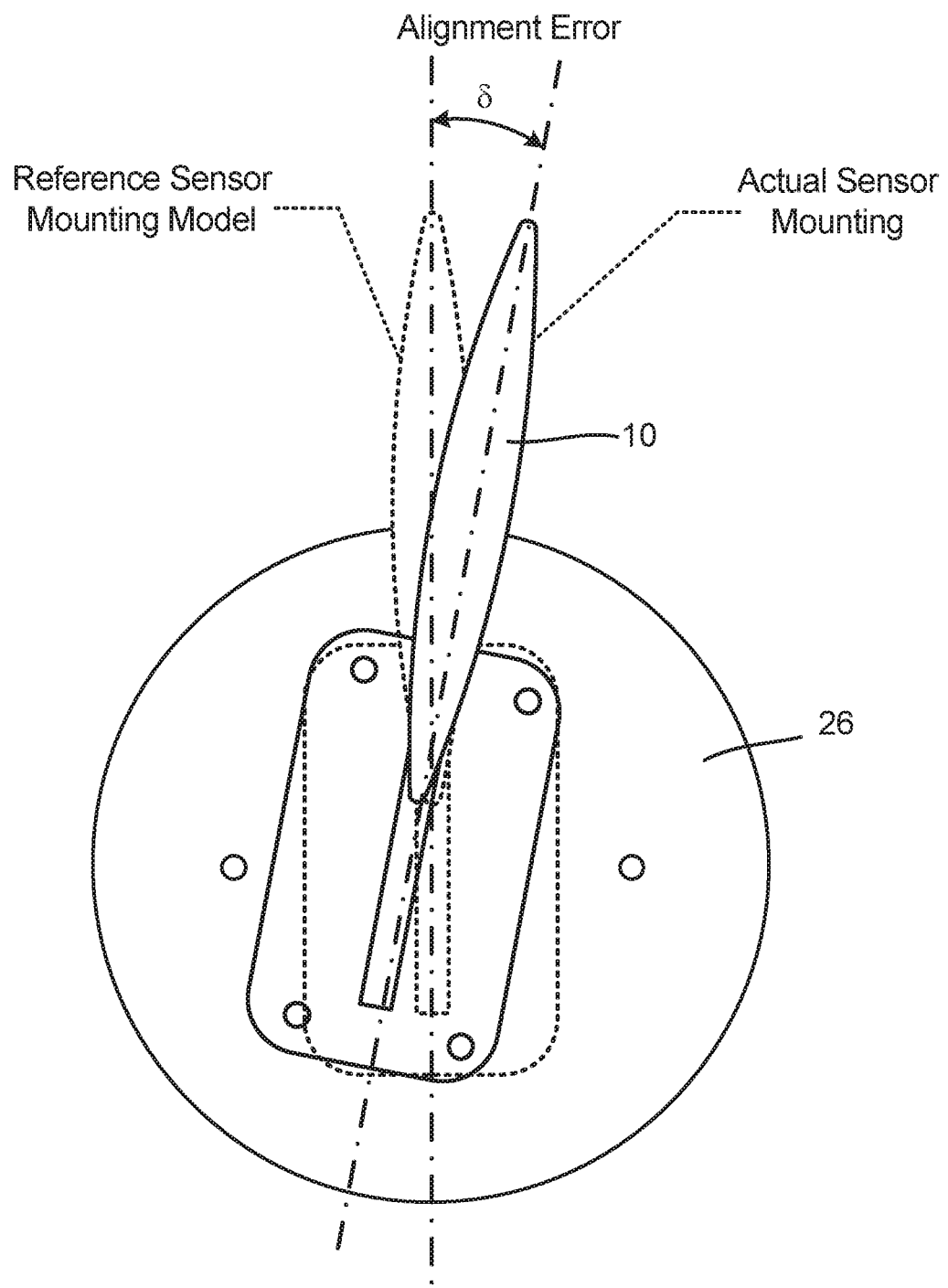
FIG. 10 is an illustration of using the overlaying method to measure the alignment error of an air data probe.

FIG. 10 is an illustration of using an overlaying method to measure the alignment error of air data probe 10. In addition to the reference dimensions for air data probe 10, probe database 62 includes stored images for each air data probe 10. In another aspect of the disclosure, system 28 can take the image of air data probe 10 captured by image sensor 32 and project the captured image over the reference image of air data probe 10 stored in probe database 62. Feature extractor 50 takes the captured image of air data probe 10 and overlays the captured image of air data probe 10 onto the reference image of air data probe 10. Next, alignment calculator 52 compares a plurality of data points along air data probe 10 to calculate the misalignment of air data probe 10. The overlay method as shown in FIG. 10 can detect rotational misalignment (e.g., yaw, pitch, or roll), sliding misalignment (e.g., fuselage station, waterline, or step), or damage to air data probe 10.

Figure 11:
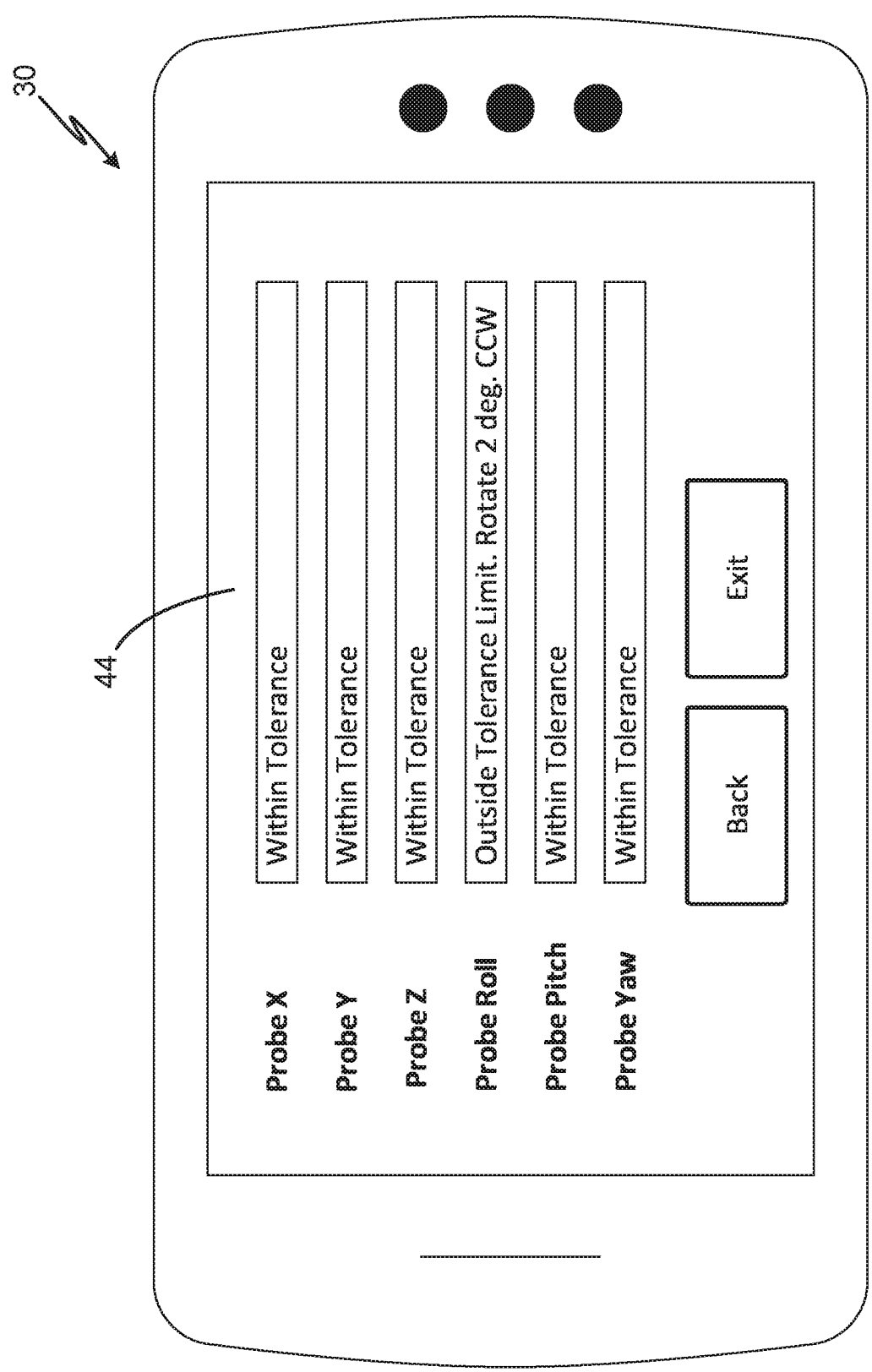
FIG. 11 is an illustration of the air data probe alignment results displayed on the graphical user interface.
Figure 12:
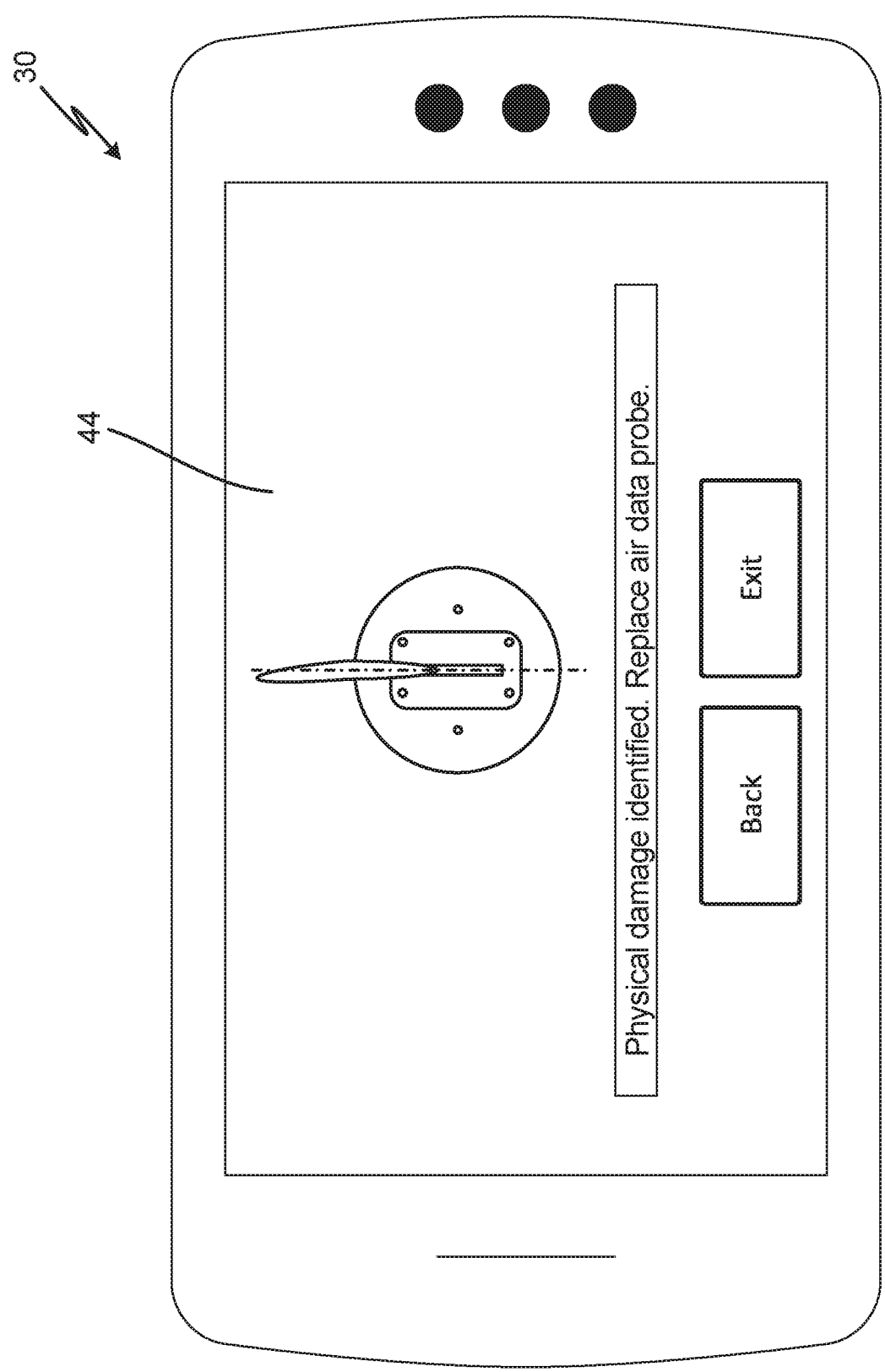
FIG. 12 is an illustration of air data probe physical damage error results displayed on the graphical user interface.

FIGS. 11 and 12 will be discussed concurrently. FIG. 11 is an illustration of the alignment results for air data probe 10 shown on display 44 of portable electronic device 30. FIG. 12 is an illustration of a physical damage error of air data probe 10 displayed on display 44. After System 28 calculates the misalignment of air data probe 10 and analyzes whether air data probe 10 is damaged, system 28 communicates the results of the calculations to the graphical user interface which shows the results of the alignment and damage check on display 44. As shown in FIG. 11, the results of the alignment check for air data probe 10 shows each kind of misalignment, and whether the position of air data probe 10 is within each of the alignment parameters for each of the possible misalignments. As shown in FIG. 12, if there is a maintenance suggestion, the maintenance suggestion is shown on display 44 with details on how to fix the misalignment issue (e.g., rotate the air data probe, or replace a damaged air data probe). The graphical user interfaces shown in FIGS. 11 and 12 are exemplary of a wide range of information that can be shown on display 44 to guide the user using system 28.

Figure 13A:
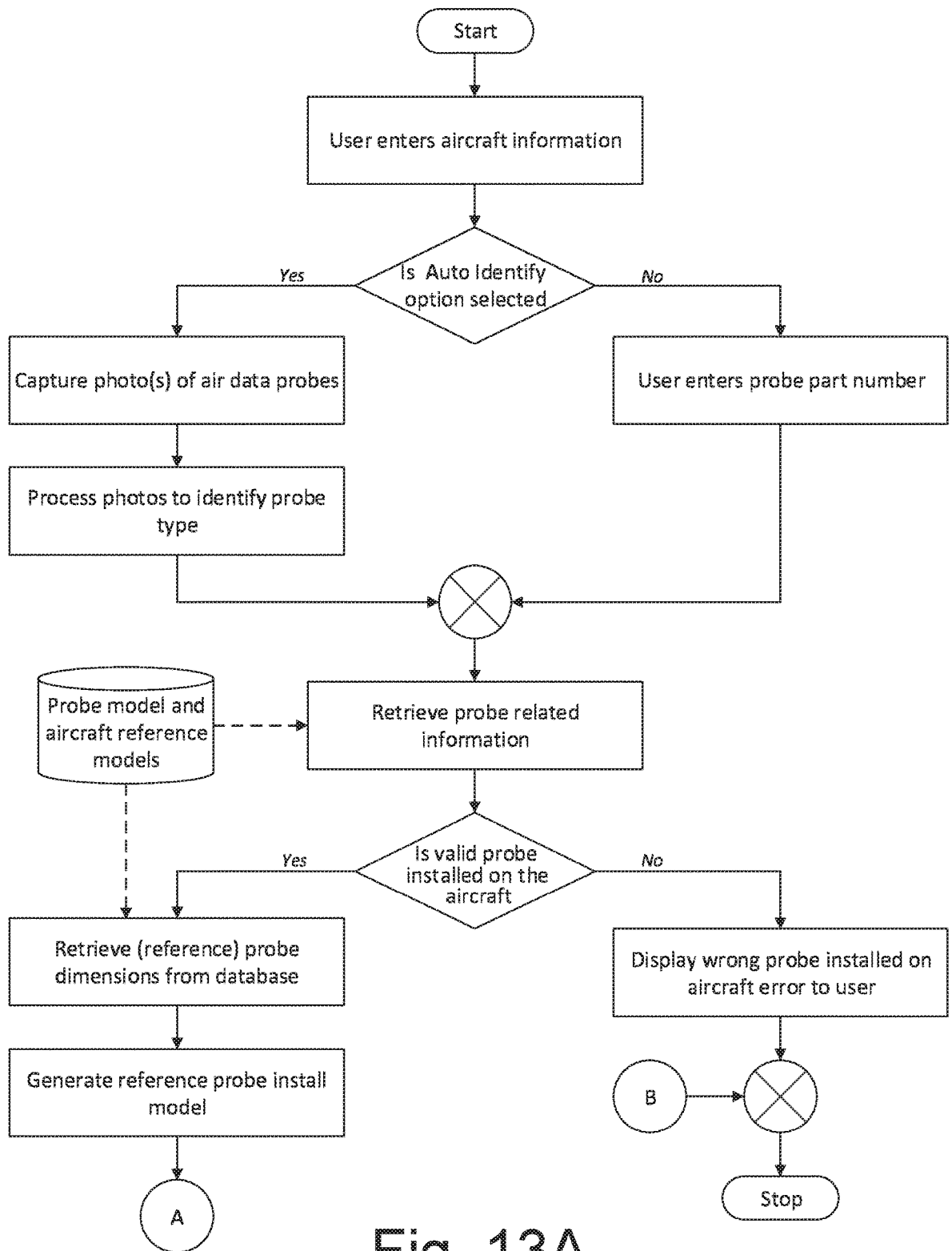
FIG. 13A is a schematic block diagram of a system for inspecting an air data probe for damage or misalignment.
Figure 13B:
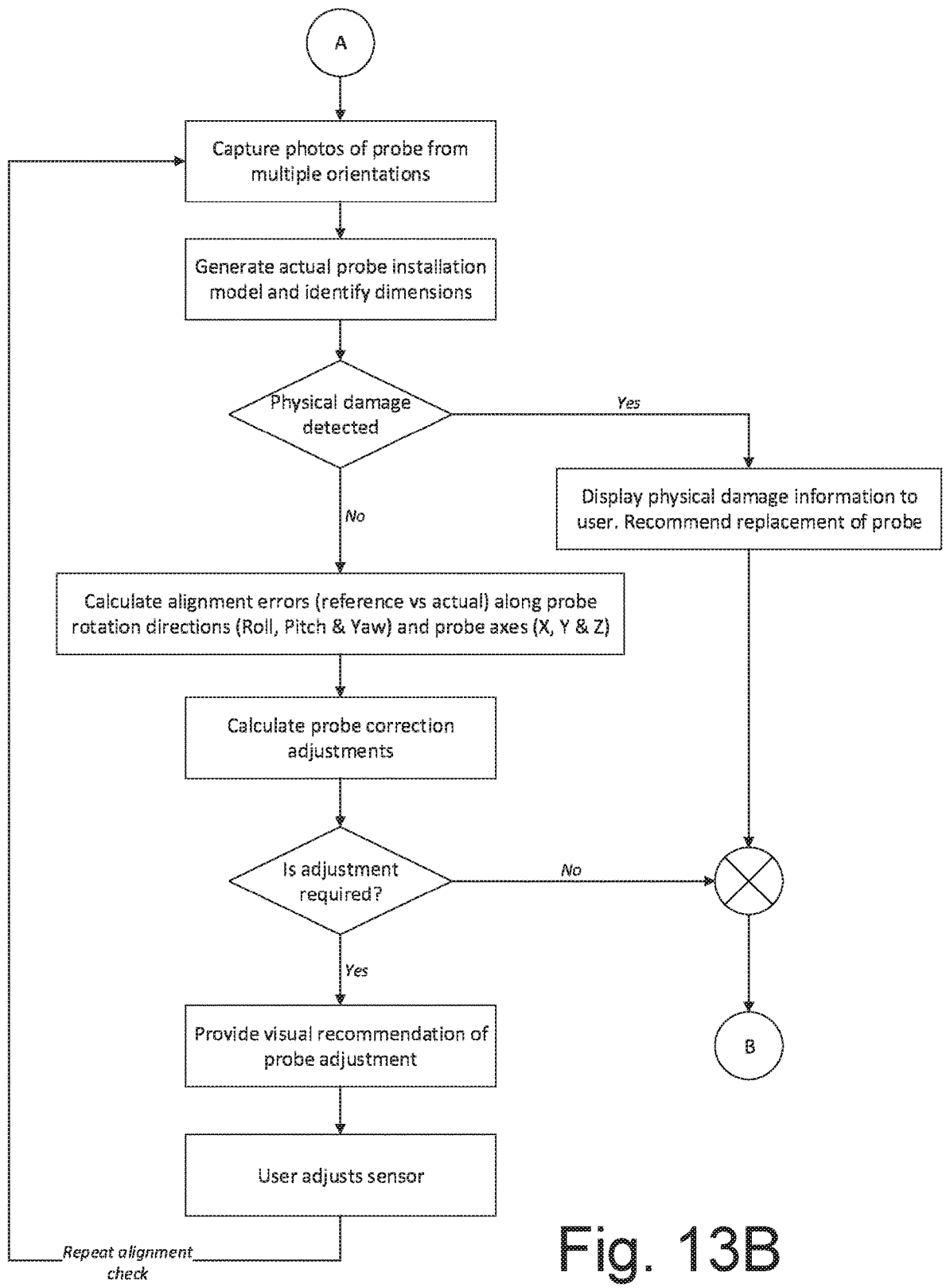
FIG. 13B is a continued schematic block diagram of the system of FIG. 13A.

FIGS. 13A and 13B will be discussed concurrently. FIG. 13A is a schematic block diagram of system 28 inspecting data probe 10 for damage or misalignment. FIG. 13B is a continued schematic block diagram of system 28 inspecting data probe 10 for damage or misalignment. First, predefined configuration 42 starts up system 28 and asks an operator to enter the aircraft information. If the operator selects "auto identify," system 28 will prompt the operator to capture images of air data probe 10 via image sensor 32 of portable electronic device 30. After images of air data probe 10 are captured, the system 32 runs probe type identifier 48 to identify air data probe 10. If "auto identify" is not selected, the user will input the part number for air data probe 10. Then, system 28 compares the identified or provided information for air data probe 10 and references the stored data in probe database 62 to verify that the correct air data probe 10 is installed on the aircraft. If air data probe 10 is deemed invalid, system 28 will display wrong probe installed on aircraft error on display 44. If a valid probe is installed on the aircraft, system 28 will retrieve reference probe dimensions from probe database 62 and generate reference probe install model.

Next, as shown in FIG. 13B, system 28 will prompt the user to capture images of air data probe 10 from various orientations, as shown in FIG. 5. Feature extractor 50 analyzes the captured images of air data probe 10 and generates an installed model and dimensions for air data probe 10. Alignment calculator 52 takes the generated dimensions of air data probe 10 and compares them to the reference data using the numerical method described in reference to FIGS. 6A-8O, and/or the overlay method as discussed in reference to FIG. 10 above, to identify damage to air data probe 10. If air data probe 10 is damaged, system 28 will output a warning showing the physical damage information and recommending replacement of air data probe 10 on display 44.

If air data probe 10 is not damaged, alignment calculator 52 will continue to analyze air data probe 10 for misalignment. Alignment calculator 52 will compare the measured dimensions and the stored reference dimensions using the numerical method described in reference to FIGS. 6A-8O, and/or the overlay method as discussed in reference to FIG. 10 above, to determine misalignment (e.g., rotational misalignment (roll, pitch, or yaw), or misalignment along probe axes (X-axis, Y-axis, or Z-axis)) of air data probe 10. Furthermore, alignment calculator 52 will calculate the amount of misalignment, and calculate the correction adjustments. Then alignment calculator 52 compares the correction adjustments to the pre-stored criteria in predefined configuration 42. If adjustment is not required, system 28 outputs the graphical user interface showing each of the misalignments within specification on display 44. If alignment calculator 52 finds that air data probe 10 has an alignment error system 28 outputs the graphical user interface showing each of the misalignments on display 44. In addition to showing each of the misalignments on display 44, system 28 will display a warning to have air data probe 10 inspected for damage and or degradation. The user adjusts air data probe 10 per the maintenance recommendation shown on display 44 and then the user restarts the program to ensure air data probe 10 is now adequately aligned.

Figure 14:
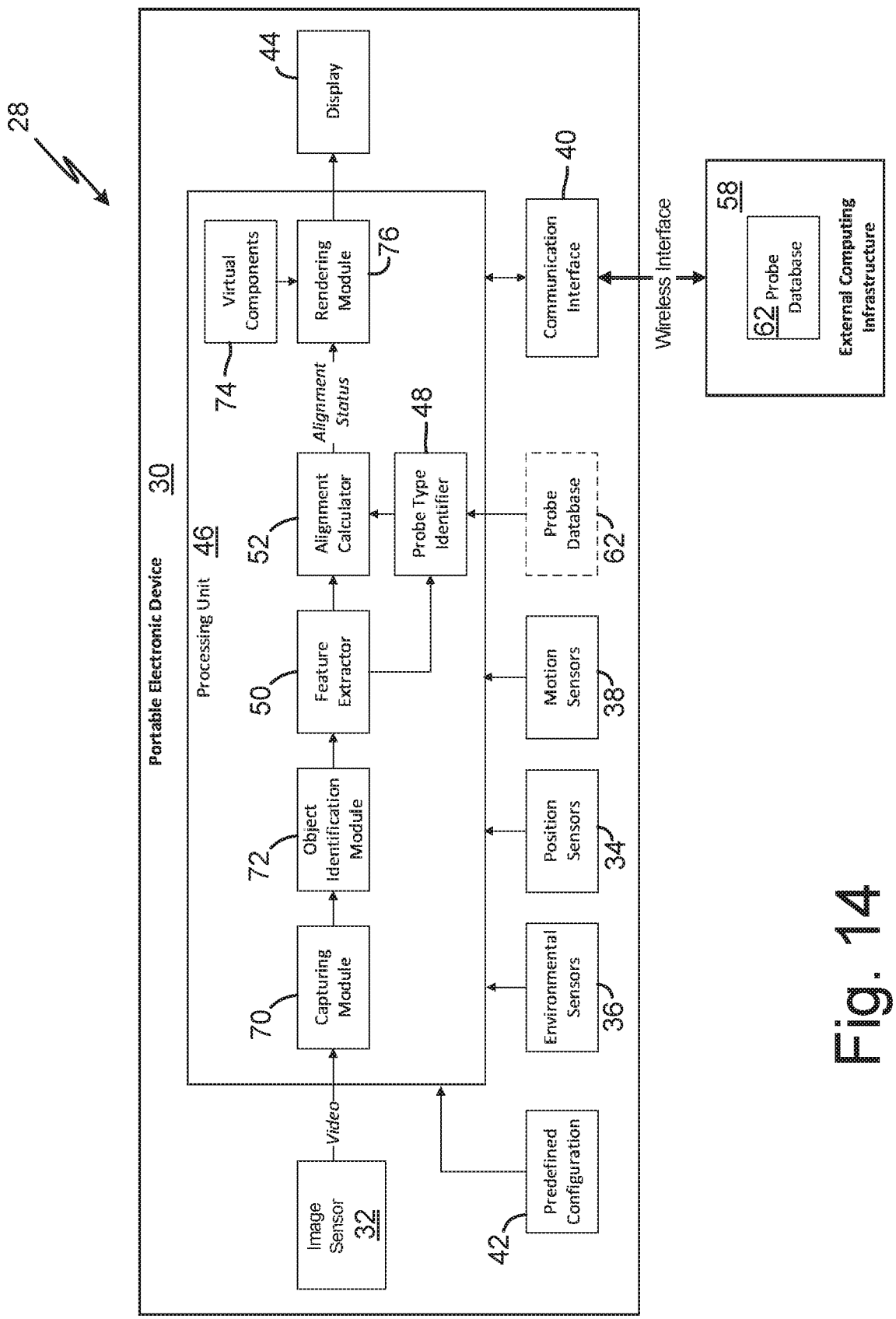
FIG. 14 is a schematic block diagram of a video-based system for inspecting an air data probe.

FIG. 14 is a schematic block diagram of video-based system 28 configured to inspect air data probe 10. When system 28 is video-based, processing unit 46 includes capture module 70, object identification module 72, virtual components 74 and rendering module 76. To enable system 28 to be video-based, image sensor 32 is configured to take video images. Capture module 70 captures the video or stream from image sensor 32. Object identification module takes the videos captured by capture module 70 and identifies the objects (e.g., air data probe 10) within the viewing direction of the captured videos. Virtual components 74 is a visual library which contains various symbols and iconology which will be displayed as augmented components on display 44. Rendering module 76 renders virtual components 74 corresponding to the maintenance recommendation for air data probe 10 provided by alignment calculator 52 and superimposes the appropriate virtual components 74 on to the videos captured by capture module 70 on display 44.

In operation, video-based system 28 uses each of position sensor 34, environmental sensors 36, and motion sensors 38 to communicate with capture module 70. Capture module 70 takes the various inputs from position sensor 34, environmental sensors 36, and motion sensors 38 (e.g., ambient light sensors or ambient temperature sensors) to auto-correct the video feed captured by capture module 70. Then, object identification module 72 dissects the video feed captured by capture module 70 to identify air data probe 10. Once air data probe 10 is identified by identification module 72, feature extractor 50 analyzes the video feed and extracts images and pre-determined data points of air data probe 10. Probe type identifier 48 uses the extracted images and data points of air data probe 10 to identify the probe type and pull the reference data from probe database 62. Alignment calculator 52 uses position sensor 34, environmental sensors 36, and motion sensors 38 of portable electronic device 30 to capture the position and orientation of portable electronic device 30. The position and orientation of portable electronic device 30 assists alignment calculator 52 when comparing data points between the video stream captured by capture module 70 and the reference data from probe database 62. Using at least the mentioned inputs, alignment calculator 52 calculates the alignment status (e.g., alignment error or maintenance suggestions) along probe rotational directions (roll, pitch, or yaw) and along probe axes (X-axis, y-axis, and Z-axis). Lastly, rendering module 76 combines the video stream captured by capture module 70 and the alignment status provided by alignment calculator 52 to output the maintenance suggestion on display 44.

Figure 15:
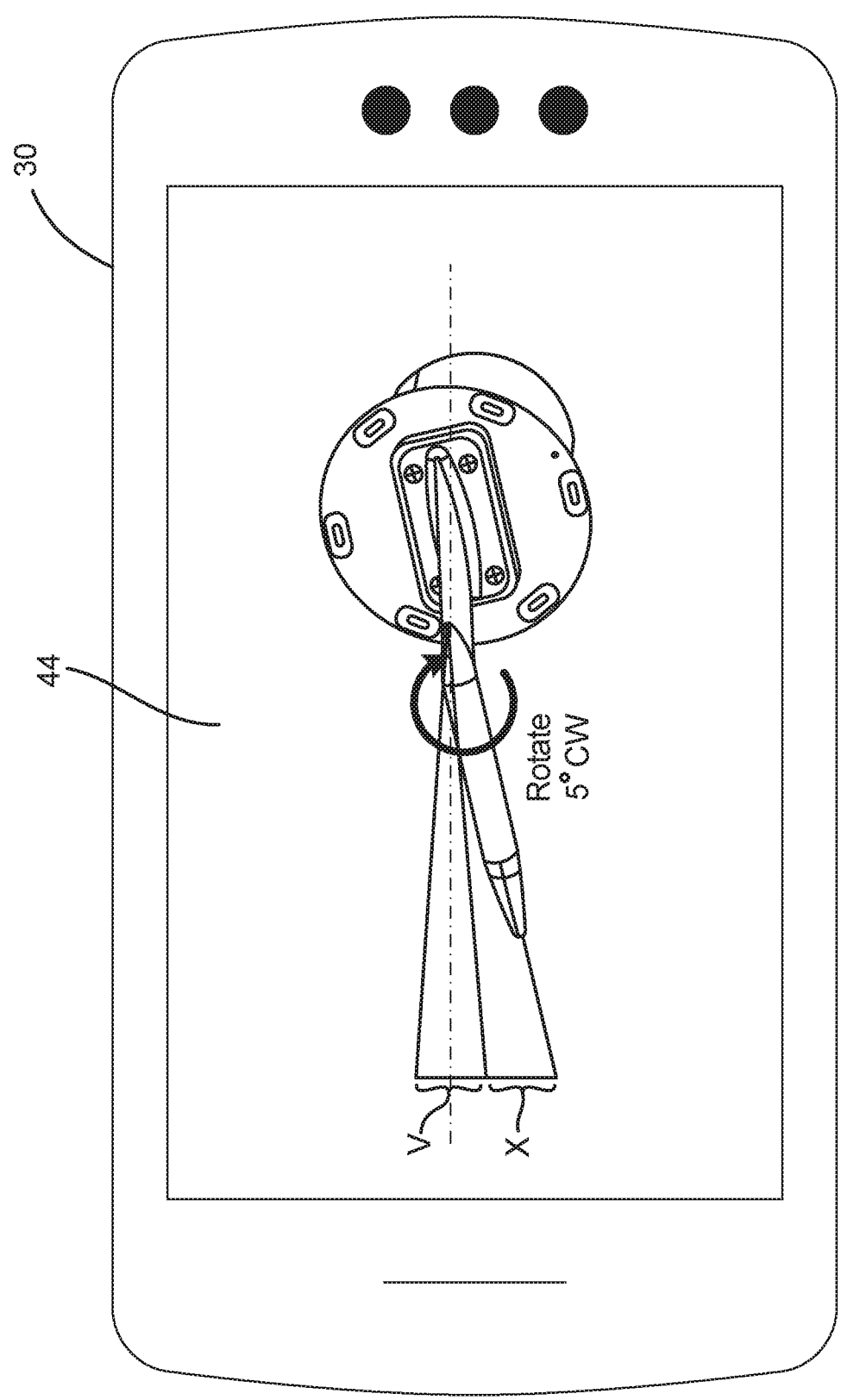
FIG. 15 is an illustration of a real-time display of an air data probe inspection results on a display of the portable electronic device.

FIG. 15 is an illustration of inspection results of air data probe 10 shown on display 44 of portable electronic device 30. Provided in the inspection results are valid tolerance limit V, outside tolerance limit X, the maintenance recommendation, and a live view of air data probe 10. In practice, the operator can loosen fasteners between air data probe 10 and mounting surface 24 and rotate air data probe 10 clockwise, until air data probe 10 is within the valid tolerance limit. After the operator rotates air data probe 10, the operator should tighten the fasteners between air data probe 10 and mounting surface 24, then re-analyze air data probe 10 to verify alignment.

Figure 16:
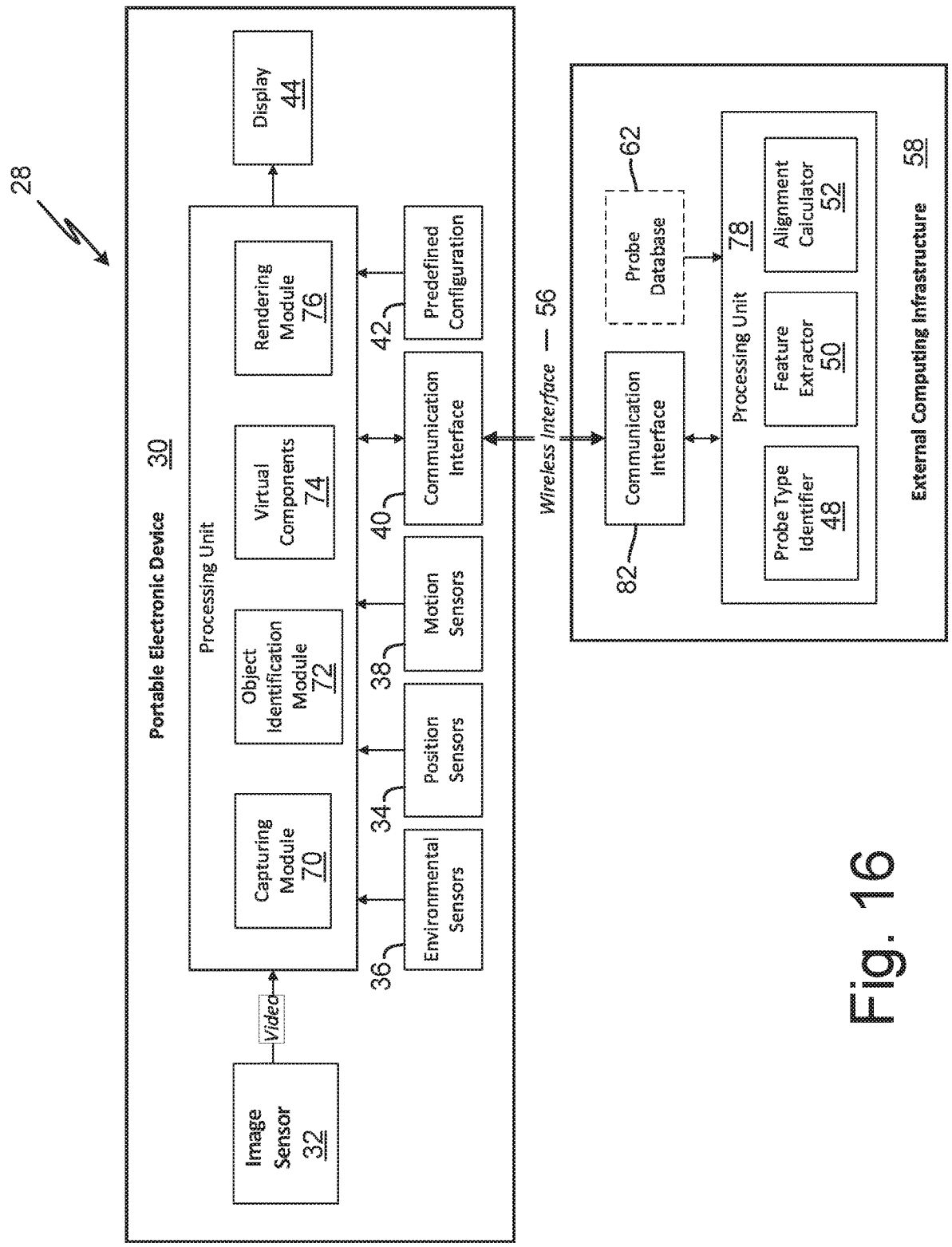
FIG. 16 is a schematic of an alternative method of a vision-based air data probe inspection method.

FIG. 16 is a schematic of an alternative configuration for vision-based system 28 that inspects air data probe 10 for damage or misalignment. External computing infrastructure 58 includes processing unit 78 and communication interface 82. In the example of the disclosure shown in FIG. 16, processing unit 46 on portable electronic device 30 is unloaded and probe type identifier 48, feature extractor 50, and alignment calculator 52 are all moved to processing unit 78 of external computing infrastructure 58. Unloading probe type identifier 48, feature extractor 50, and alignment calculator 52 from portable electronic device 30 reduces the computing power required by processing unit 46 of personal electronic device 30. Furthermore, external computing infrastructure 58 can have a faster processor than available for portable electronic device 30, thus speeding up the misalignment and damage calculations. Portable electronic device 30 communicates using communication interface 40 with communication interface 82 of external computing infrastructure 54 via wireless interface 56. Wireless interface 56 can be a network interface card, such as an Ethernet card, an optical transceiver, a radio frequency transceiver, a Bluetooth, 3G, 4G, 5G, Long-Term-Evolution (LTE), or Wi-Fi transceiver, or any other type of device that can send and receive wired and/or wireless data.

Thus, portable electronic device 30 captures live video using image sensor 32 and capture module 70. Then object identification module 72 dissects the captured video and finds air data probe 10. The sensors on portable electronic device 30 (environmental sensors 36, motion sensors 38, and motion sensors 38) are all active, and portable electronic device 30 communicates the sensor information and the live video stream to external computing infrastructure 58. External computing infrastructure 58 compiles the information from portable electronic device 30 and probe database 62. External computing infrastructure 58 then uses the compiled information when running probe type identifier 48, feature extractor 50, and alignment calculator 52. After each of probe type identifier 48, feature extractor 50, and alignment calculator 52 are run, external computing infrastructure 58 communicates with portable electronic device 30 via wireless interface 60. Lastly, portable electronic device 30 takes the information from external computing infrastructure 58 and virtual components 74 and runs them through rendering module 76. Rendering module 76 overlays the live feed video image captured by image sensor 32 and capture module 70 and outputs an image of the live video feed with the maintenance suggestion overlaid on display 44. In another example, portable electronic device 30 can be connected to an augmented display eyewear.

Figure 17:
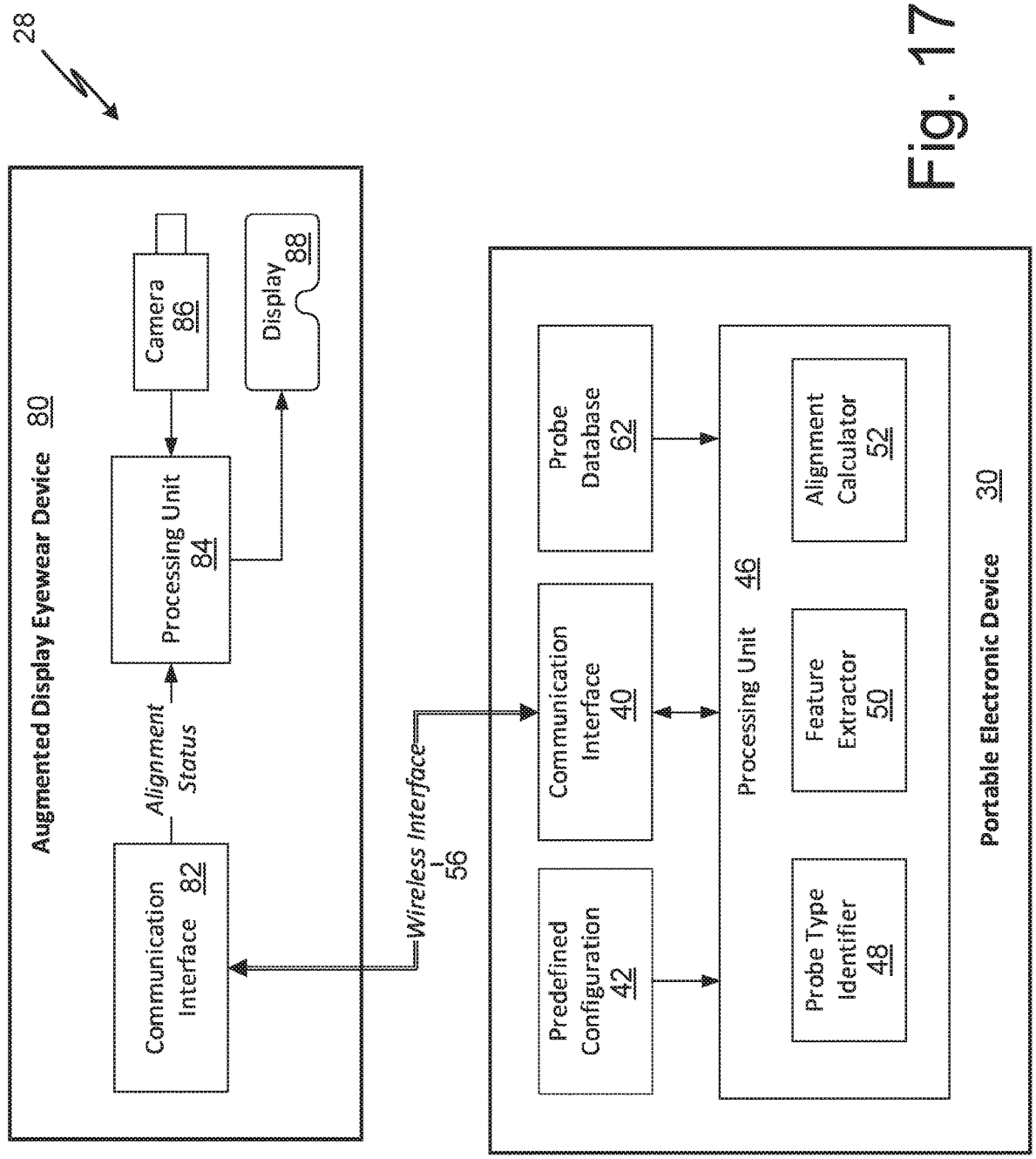
FIG. 17 is a schematic block diagram of a vision-based air data probe inspection system that uses an augmented display device.

FIG. 17 is a schematic block diagram of system 28 utilizing a video-based detection method for analyzing the misalignment and damage of air data probe 10 that further includes augmented display eyewear device 80. Augmented display eyewear device 80 includes communication interface 82, processing unit 84, camera 86 and display 88. Communication interface 82 is used to communicate with portable electronic device 30. Communication interface 82 can be a network interface card, such as an Ethernet card, an optical transceiver, a radio frequency transceiver, a Bluetooth, 3G, 4G, 5G, Long-Term-Evolution (LTE), or Wi-Fi transceiver, or any other type of device that can send and receive wired and/or wireless data. Processing unit 84 takes in the video captured by camera 86 and communicates that to portable electronic device 30. Processing unit 84 also translates the alignment status determined by portable electronic device 30 and displays the alignment status or maintenance recommendation on display 88 of augmented display eyewear device 80. Camera 86 includes optical and electrical components, such as one or more lenses and image sensors configured to capture still and/or moving images within a field of view of camera 86. Display 88 projects an augmented image on to the surface of augmented display eyewear device 80 so that the alignment status or maintenance suggestions are superimposed on air data probe 10 as the operator looks at air data probe 10 through augmented display eyewear device 80.

Figure 18:
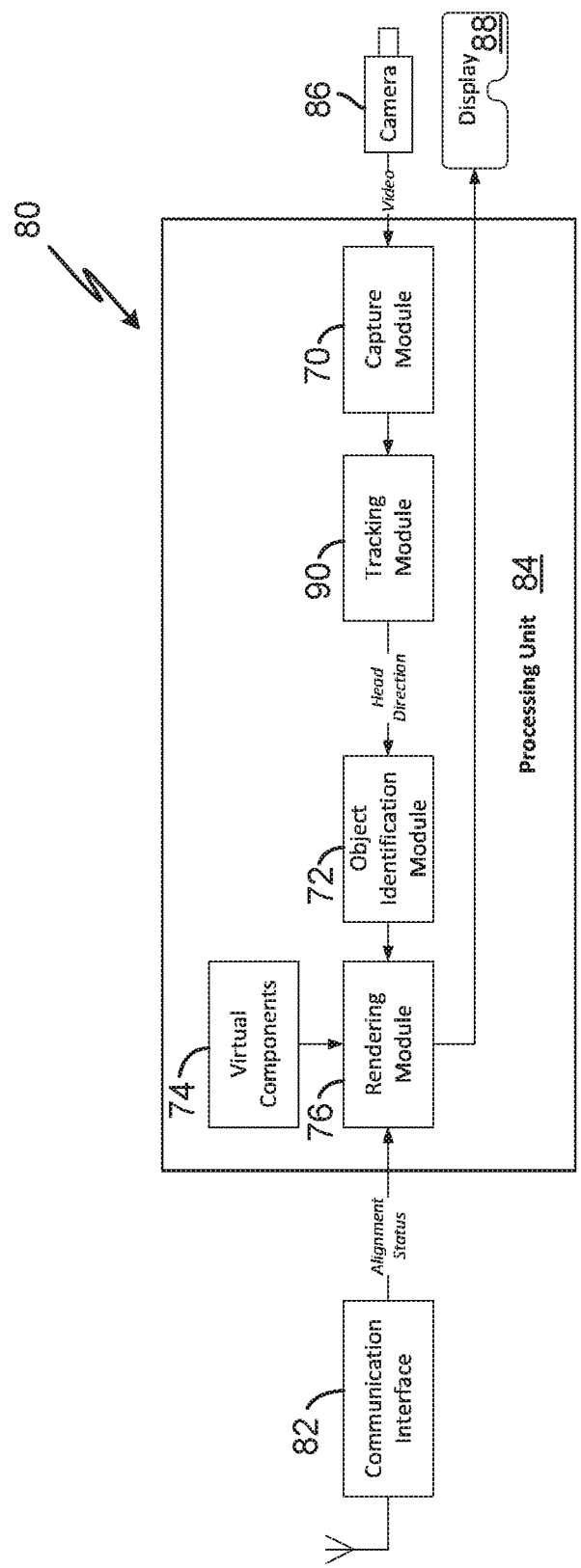
FIG. 18 is a schematic block diagram of an augmented display device components.

FIG. 18 is a schematic block diagram of augmented display eyewear device 80. Augmented display eyewear device 80 includes processing unit 84. Processing unit 84 includes capture module 70, object identification module 72, virtual components 74, rendering module 76, and tracking module 90. Each of capture module 70, object identification module 72, virtual components 74, rendering module 76 function similarly as discussed above with reference to FIG. 14. Tracking module 90 tracks various objects along the head direction and orientation, while object identification module 72 identifies objects like air data probe 10, along the head direction. Augmented display eyewear device 80 communicates with portable electronic device 30 via communication interface 82. Augmented display eyewear 80 communicates the video feed captured by capture module 70, and the head direction and air data probe information captured by tracking module 90 and object identification module 72 as inputs into alignment calculator 52. After portable electronic device 30 completes the alignment calculations, portable electronic device 30 sends the alignment status and maintenance recommendation to augmented display eyewear device 80 through communication interface 82. Augmented display eyewear device 80 combines virtual components 74, alignment status, and maintenance recommendation using rendering module 76 and displays the resulting image on display 88.

Figure 19:
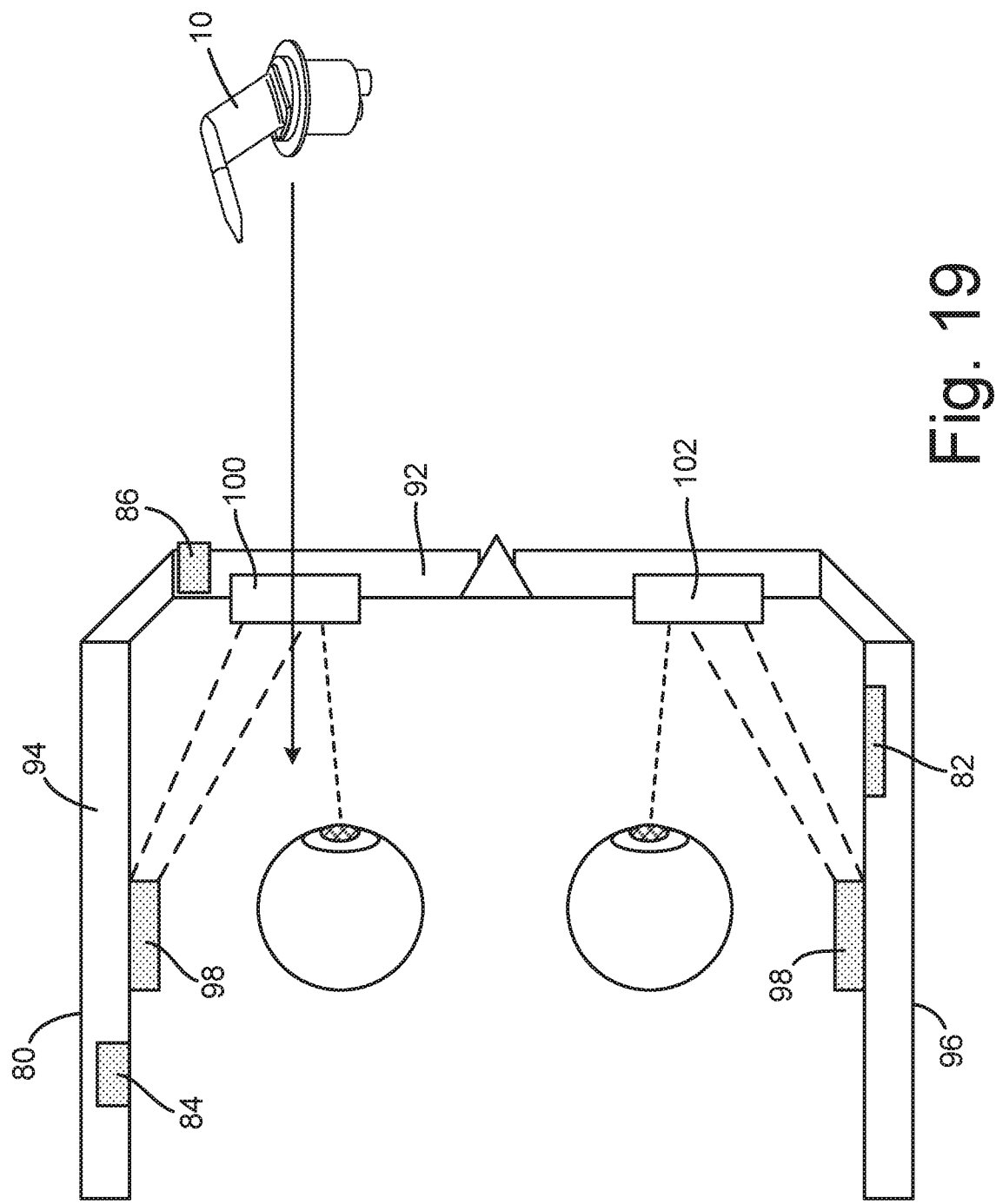
FIG. 19 is a plan view of an eyewear device with the augmented display components.

FIG. 19 is a plan view of augmented display eyewear device 80. Augmented display eyewear device 80 includes front section 92, first side section 94, second side section 96, micro projector(s) 98, first lens 100, and second lens 102. First side section 94 and second side section 96 extend in the same direction from opposite ends of front section 92. In the example shown in FIG. 19, processing unit 84 and one micro projector 98 are located on first side section 94. In another example, processing unit 84 and one micro projector 98 can be located on second side section 96. In the example shown in FIG. 19, communication interface 82 and a second micro projector 98 are located on second side section 96. In another example, communication interface 82 and the second micro projector 98 can be located on first side section 94. Camera 86, first lens 100, and second lens 102 are located on front section 92. First lens 100 and second lens 102 are spaced apart on front section 92 so that each of first lens 100 and second lens 102 align with the eyes of an operator. Each of first lens 100 and second lens 102 are semitransparent and semi reflective so that the images projected from micro projector(s) 98 can be visible from the operator while they are wearing augmented display eyewear device 80.

In the example of FIG. 19, augmented display eyewear device 80 includes first lens 100 and second lens 102. In another example, the entirety of front section 92 could be a semitransparent and semi reflective surface, thereby being one continuous lens 104, as discussed below with reference to FIG. 20.

Figure 20:
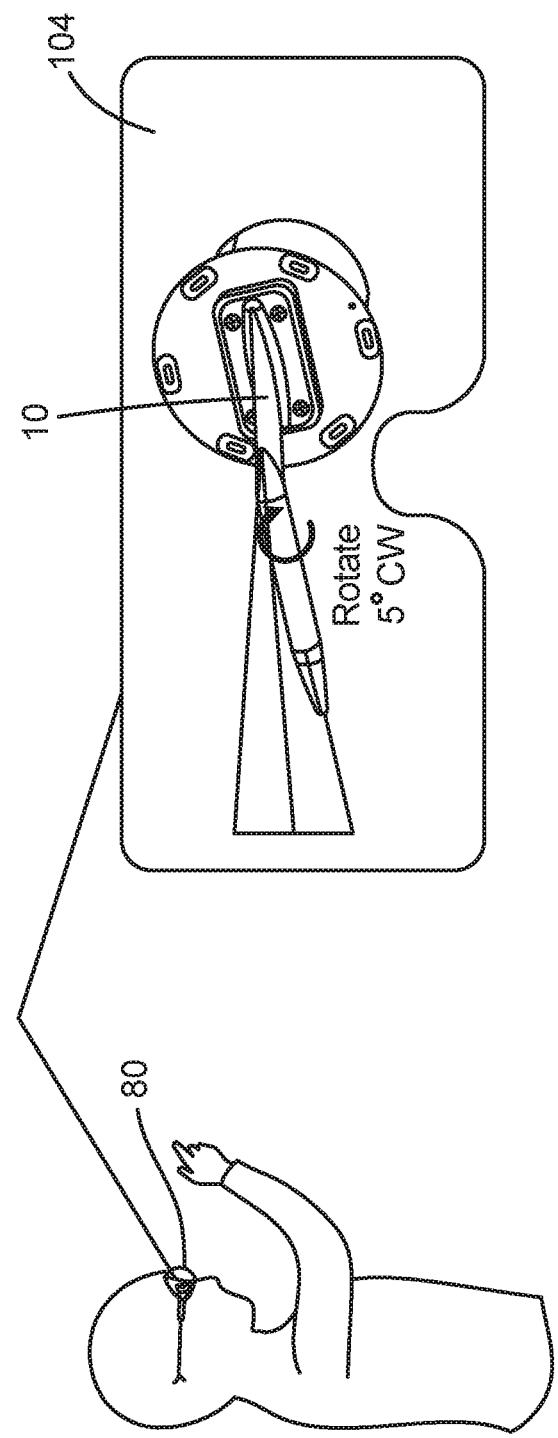
FIG. 20 is an illustration of an operator wearing the eyewear device with the augmented display and an illustration of the display as seen by the operator on the augmented display of the eyewear device.

FIG. 20 is an illustration of an operator wearing augmented display eyewear device 80 including an illustration of the display, as seen by the operator projected onto continuous lens 104. As the operator looks toward air data probe 10, camera 86 on augmented display eyewear device 80 sends live video feed to capture module 70, which captures the live feed video. After system 28 completes the alignment and damage analysis, system 28 outputs a maintenance recommendation. The maintenance recommendation is then projected using micro projector(s) 98 onto continuous lens 104. As the maintenance recommendation is projected onto continuous lens 104, the maintenance recommendation can overlay air data probe 10 so that the operator has a live-feed maintenance recommendation when the operator looks at air data probe 10.

Figure 21:
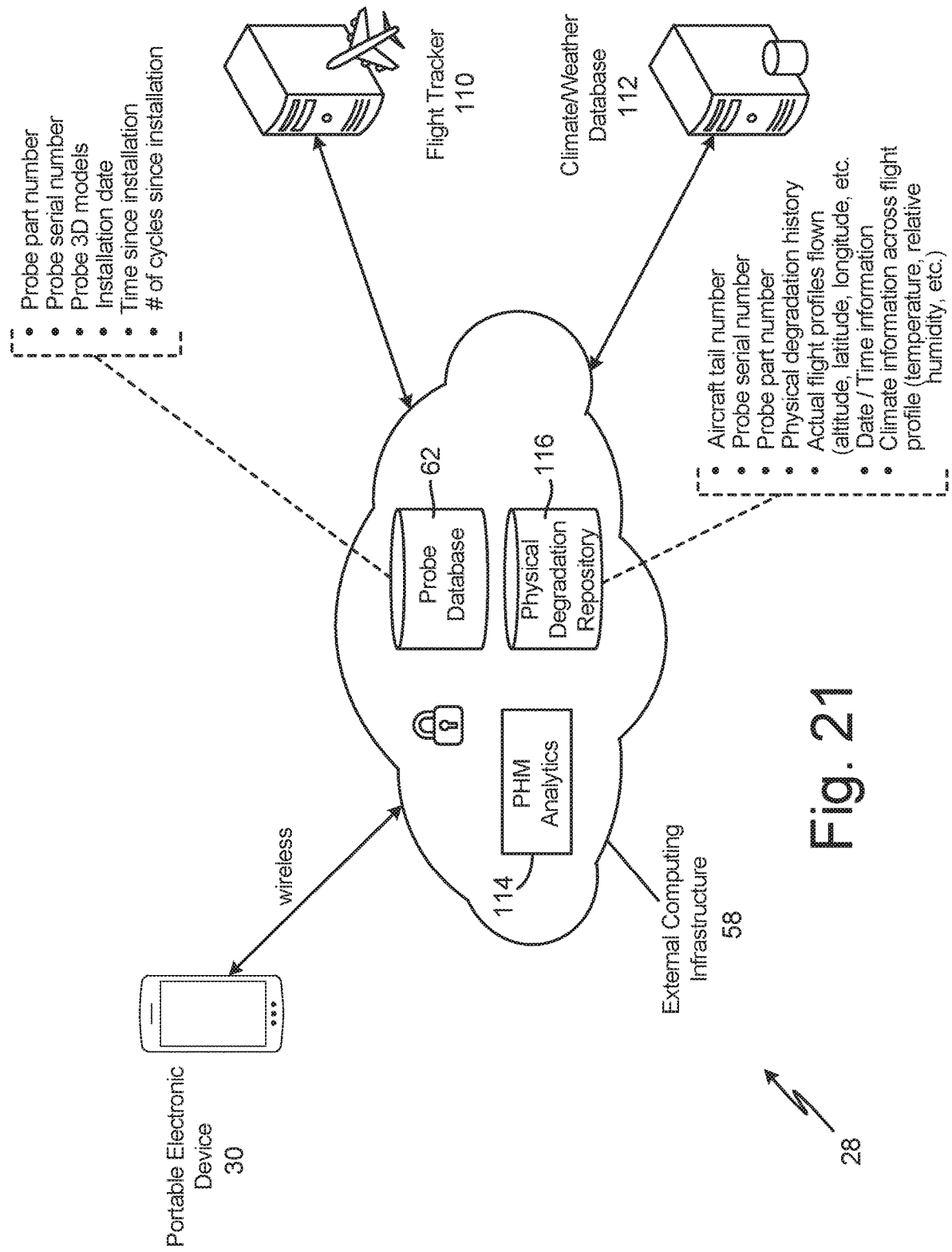
FIG. 21 is an illustration of a system used to detect physical degradation of an air data probe.

FIG. 21 is an illustration of system 28 when used to detect physical degradation for air data probe 10. In the example of FIG. 21, system 28 can include flight tracker 110, and climate or weather database 112. External computing infrastructure 58 includes prognostic health monitoring (PHM) analytics module 114 and physical degradation repository 116. Flight tracker 110 stores all flight profile information for the aircraft. Climate database 112 stores all climate and weather data through which the aircraft has traveled. Physical degradation repository 116 stores data pertinent to the health of air data probe 10. Physical degradation repository 116 stores past data of physical degradation of inspected air data probe 10, rate of change of physical degradation over time for inspected air data probe 10, past data of physical degradation of similar probes to air data probe 10 along all flight routes, past data of physical degradation of different model number probes to air data probe 10 along all flight routes, and past data of physical degradation of different model number probes to air data probe 10 in similar flying conditions. All the data stored in each of flight tracker 110, climate database 112, and physical degradation repository 116 are used by PHM analytics module 114 while calculating the remaining useful life of air data probe 10.

Portable electronic device 30 communicates with external computing infrastructure 58 via wireless interface 56. In addition to calculating the misalignment of air data probe 10, and determining whether air data probe 10 is damaged, portable electronic device 30 and system 28 can be used to inspect air data probe 10 for degradation.

Figure 22:
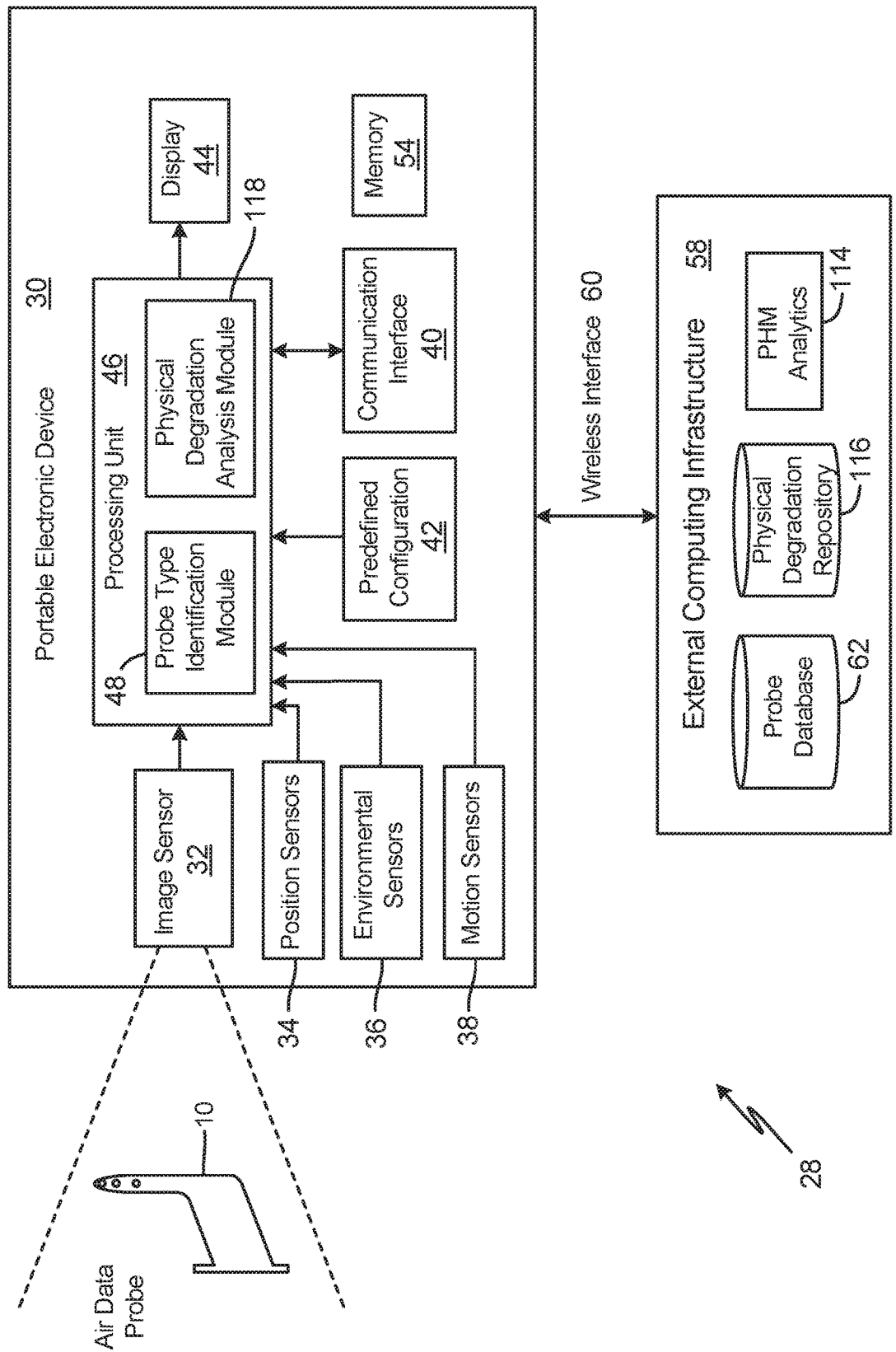
FIG. 22 is a schematic block diagram of a system configured to detect physical degradation of an air data probe.

FIG. 22 is a schematic block diagram of system 28 configured to detect physical degradation of air data probe 10. To configure system 28 to detect physical degradation of air data probe 10, processing unit 46 of portable electronic device 30 includes physical degradation analysis module 118 and external computing infrastructure 58 includes physical degradation repository 116 and PHM analytics module 114. The rest of the components in system 28 function and interact similarly to the examples discussed in FIGS. 3, 14, 16, 17, and 18.

Physical degradation analysis module 118 enables system 28 to determine a level of physical degradation in air data probe 10. Physical degradation module 118 compiles information from sensors contained in portable electronic device 30 (e.g., position sensor 34, environmental sensor 36, and/or motion sensor 38). The information compiled by physical degradation module 118 enables system 28 to auto correct and normalize the images captured by image sensor 32. Physical degradation module 118 then analyzes the images captured by image sensor 32 for physical degradation (e.g., corrosion on the surface of air data probe 10, physical deformation of the body of air data probe 10, physical deformation of one or more of the pressure ports (pitot pressure port 18, static pressure port 20A, static pressure port 22A, as shown in FIG. 1), and/or physical blockage of the pressure ports. The analyzed physical degradation is then stored in physical degradation repository with reference to the identifiers of air data probe 10.

Figure 23:
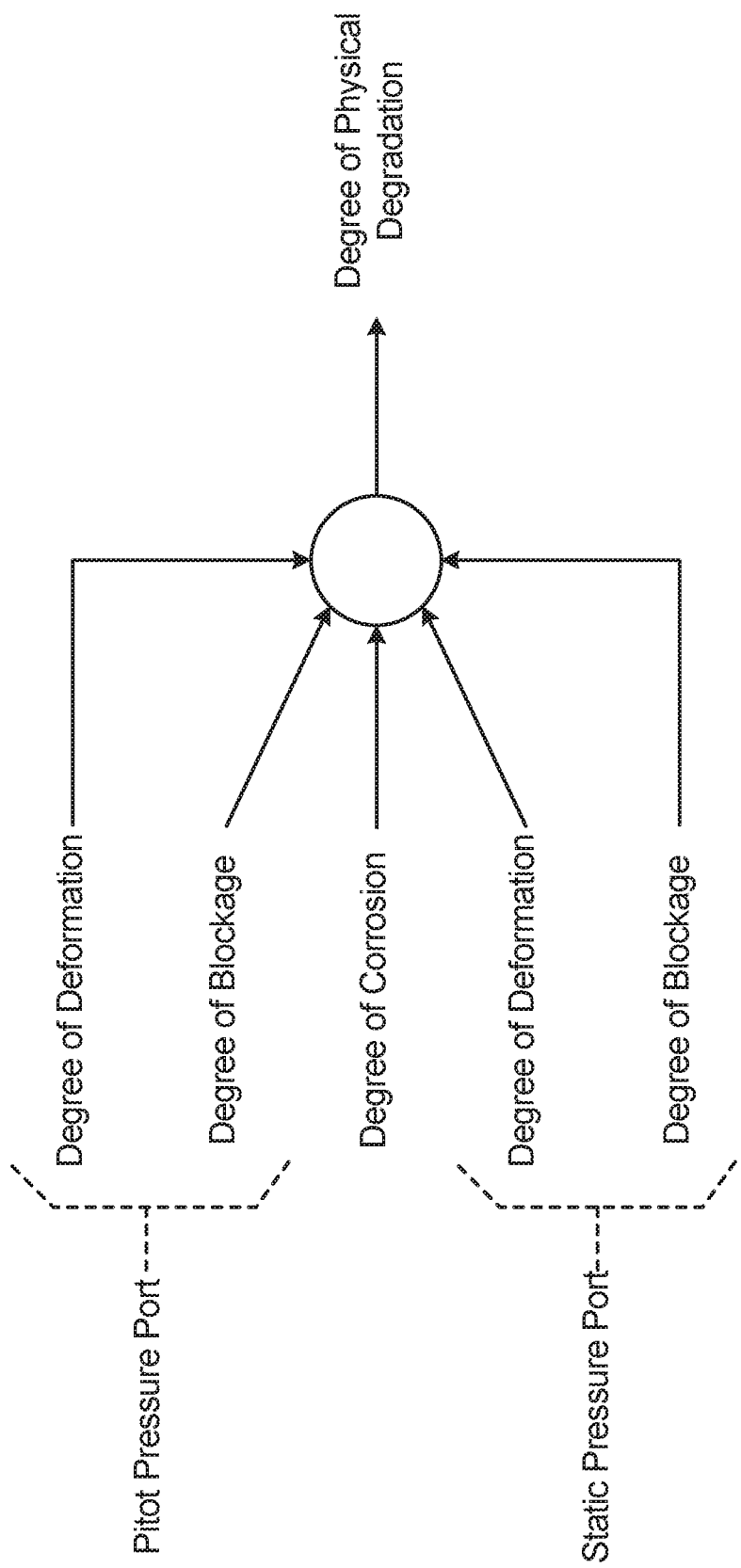
FIG. 23 is an illustration showing a physical degradation analysis module configured to determine the degree of physical degradation for an air data probe.

FIG. 23 is an illustration showing how physical degradation analysis module 118 determines the degree of physical degradation for air data probe 10. Physical degradation analysis module 118 determines the degree of deformation, degree of blockage, and degree of corrosion for air data probe 10 and each of pitot pressure port 18, static pressure port 20A, and static pressure port 22A, to determine the degree of physical degradation of air data probe 10. Physical degradation analysis module 118 analyzes the captured images/videos of air data probe 10 to identify corrosion upon air data probe 10, and to identify the presence, location, and/or the degree of corrosion on air data probe 10. Corrosion on the surface of air data probe 10 changes the contrast of the image of air data probe 10. If the contrast of air data probe 10 is dark, air data probe 10 is likely corroded, while if the contrast of air data probe 10 is light, air data probe 10 is not likely corroded. Another indicator of corrosion on air data probe 10 is surface texture or surface pattern. If the surface of air data probe 10 is smooth, corrosion is unlikely present on air data probe 10. If the surface of air data probe 10 is rough, corrosion is likely present on air data probe 10. Therefore, physical degradation analysis module 118 is configured to analyze changes in contrast on the surface of air data probe 10 to predict if corrosion is likely present on air data probe 10. Furthermore, physical degradation analysis module 118 is configured to identify the edges of a set threshold of change in contrast using edge detection methods (e.g., Sobel, Canny, Prewitt, Roberts, fuzzy logic, and/or any other method used to detect edges of an object) to determine if and where corrosion occurs on air data probe 10.

Physical deformation can occur to the pressure ports of air data probe 10. Physical deformation manifests itself in changing the outer profile of the pressure ports on air data probe 10. Therefore, physical degradation analysis module 118 is configured to compare the captured images, or video images, of air data probe 10 to the reference images of air data probe 10 stored in probe database 62. In particular, physical degradation analysis module 118 compares the outer profile of the pressure ports in the collected images to the known dimensions of the outer profiles of the pressure ports in the reference data stored in probe database 62.

Physical blockage occurs when the pressure ports of air data probe 10 are blocked, either by corrosion or some other foreign material. Physical blockage makes the pressure ports of air data probe 10 smaller, thereby altering the airflow into air data probe 10 and affecting the accuracy of the data sampled by air data probe 10. Therefore, physical degradation analysis module 118 is configured to compare the captured images, or video images, of air data probe 10 to the reference images of air data probe 10 stored in probe database 62. In particular, physical degradation analysis module 118 compares the inner profile of the pressure ports in the collected images to the known dimensions of the inner profiles of the pressure ports in the reference data stored in probe database 62.

Figure 24:
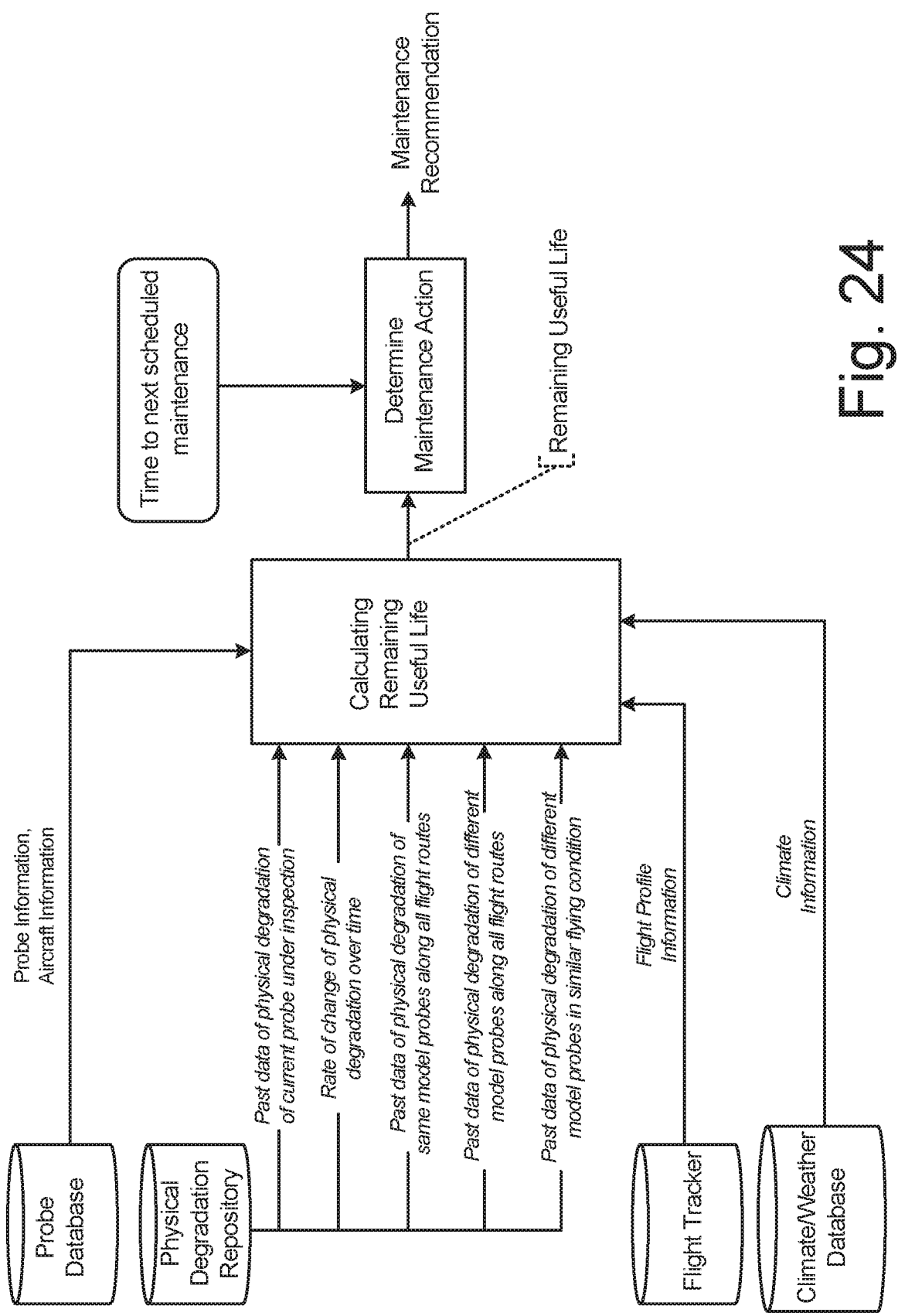
FIG. 24 is a block diagram of a prognostic health monitoring (PHM) analytics module configured to calculate the remaining useful life for an air data probe.

FIG. 24 is a block diagram showing how PHM analytics module 114 calculates the remaining useful life for air data probe 10. PHM analytics module 114 collects information from probe database 62, flight tracker 110, climate or weather database 112, and physical degradation repository 116 to calculate the remaining useful life for air data probe 10. Probe database 62 provides probe information (e.g., probe model number or probe identification number). Flight tracker 110 provides flight profile information. Climate or weather database 112 provides all climate and weather information through which the aircraft has flown. Physical degradation repository 116 provides past data of physical degradation of the inspected air data probe 10, rate of change of physical degradation over time for the inspected air data probe 10, past data of physical degradation of similar probes to air data probe 10 along all flight routes, past data of physical degradation different model number probes to air data probe 10 along all flight routes, and past data of physical degradation of different model probes to air data probe 10 in similar flying conditions.

Using the collected information, PHM analytics module 114 calculates the remaining useful life for air data probe 10 and compares the remaining useful life of air data probe 10 to the next scheduled maintenance date. If the remaining useful life of air data probe 10 is calculated to be less than the time until the next schedule maintenance, PHM analytics module 114 generates a maintenance request warning. PHM analytics module 114 communicates the maintenance request warning to portable electronic device 30, and the maintenance request warning is displayed on display 44.

In another example, PHM analytics module 114 can calculate the remaining useful life for air data probe 10 and compare the remaining useful life of air data probe 10 to the next scheduled maintenance date. If the remaining useful life of air data probe 10 is calculated to be less than the time until the next schedule maintenance, PHM analytics module 114 generates a maintenance request warning. PHM analytics module 114 communicates the maintenance request warning to portable electronic device 30, and portable electronic device 30 communicates the maintenance request warning to augmented display eyewear device 80, which displays the maintenance request warning on display 88.

In another example, PHM analytics module 114 can be configured to implement machine learning techniques to pattern match the physical degradation air data probe 10 under inspection over the service life by looking into a larger data set of data from physical data repository 116. Furthermore, the aircraft maintenance crew, or the flight crew could routinely take images or videos of air data probe 10 during their routine pre-flight checks. These images can be communicated to system 28, and system 28 can proactively determine the degradation of air data probe 10 and proactively provide reports of suggested maintenance for air data probe 10.

Figure 25A:
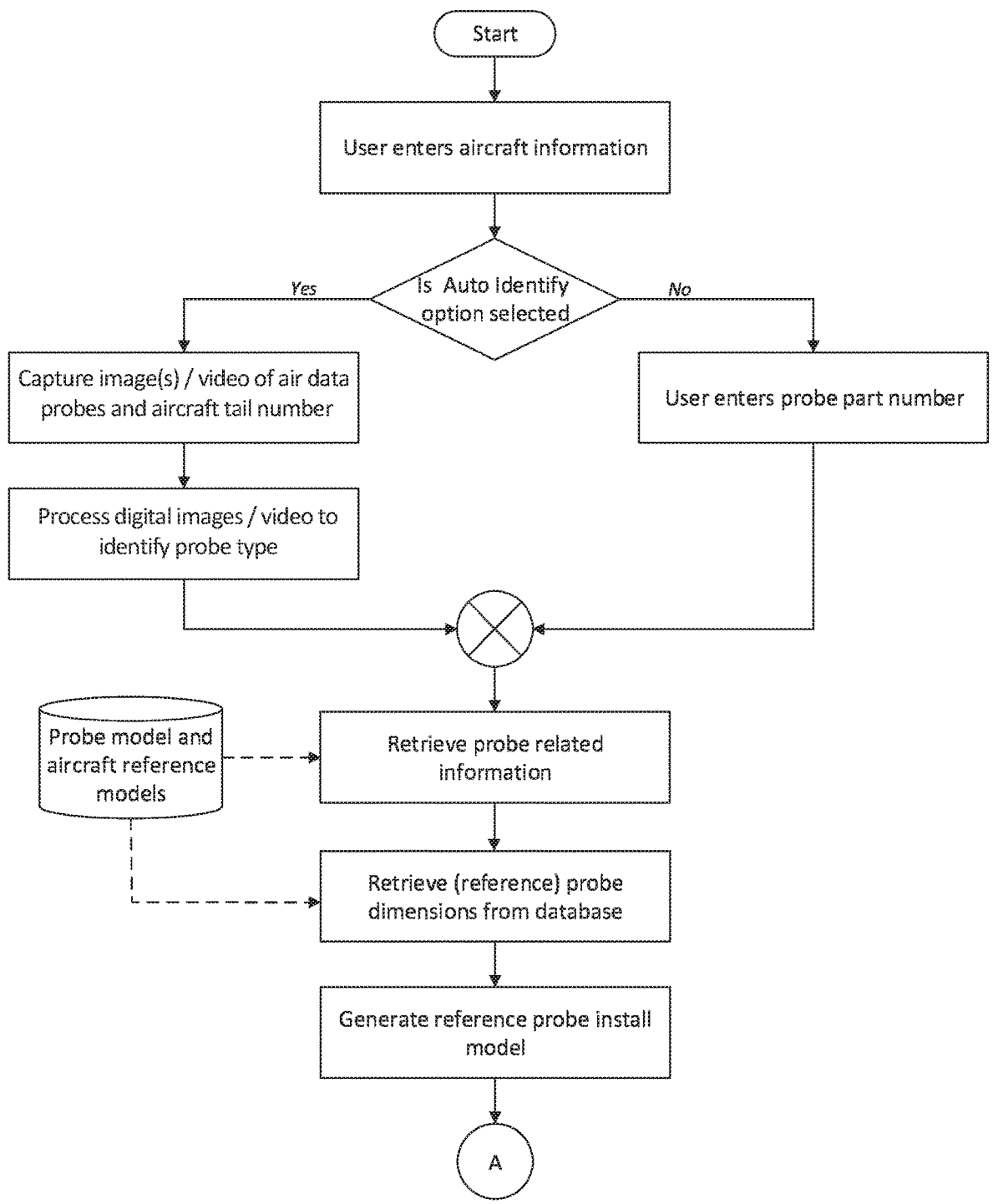
FIG. 25A is a schematic block diagram of a system configured to perform physical degradation analysis of an air data probe.
Figure 25B:
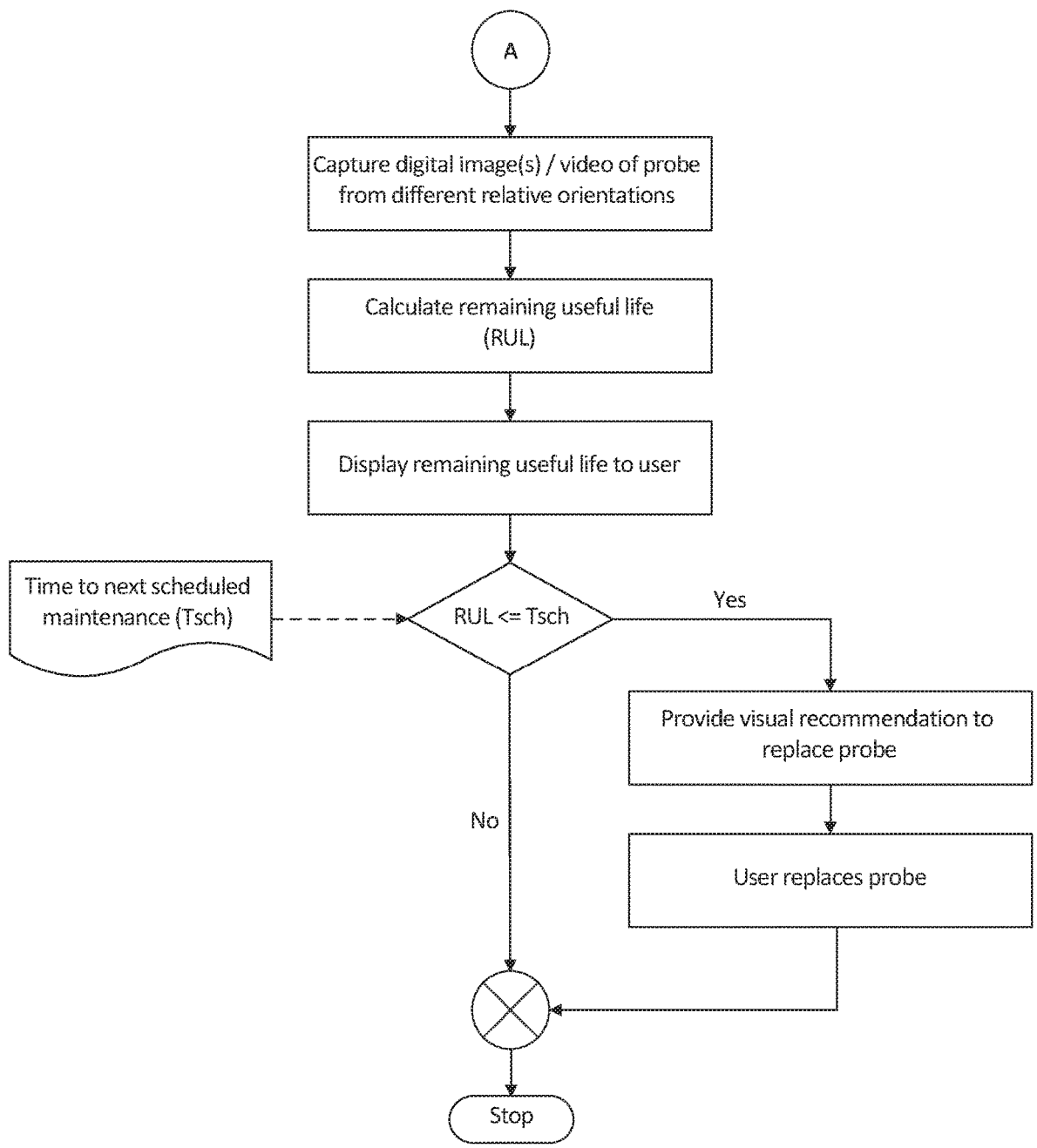
FIG. 25B is a continued schematic block diagram of the system from FIG. 25A.

FIGS. 25A and 25B will be discussed concurrently. FIG. 25A is a schematic block diagram of system 28 completing physical degradation analysis of air data probe 10. FIG. 25B is a continued schematic block diagram of system 28 completing physical degradation analysis of air data probe 10. First, predefined configuration 42 starts up system 28 and asks operator to enter the aircraft information. If the operator selects "auto identify" system 28 will prompt the operator to capture images of air data probe 10 via image sensor 32 of portable electronic device 30. After images of air data probe 10 are captured, the system 32 runs probe type identifier 48 to identify air data probe 10. If "auto identify" is not selected, the user will input the part number for air data probe 10. Then, system 28 compares the identified or provided information for air data probe 10 and references the stored data in probe database 62 to verify that the correct air data probe 10 is installed on the aircraft. If air data probe 10 is deemed invalid, system 28 will display wrong probe installed on aircraft error on display 44. If a valid probe is installed on the aircraft, system 28 will retrieve reference probe dimensions from probe database 62 and generate reference probe install model.

Next, system 28 will prompt and guide the user in capturing more images or video footage from different relative orientations around air data probe 10. Then, physical degradation analysis module 118 determines the degree of deformation, degree of blockage, and degree of corrosion for air data probe 10 and each of pitot pressure port 18, static pressure port 20A, and static pressure port 22A to determine the degree of physical degradation of air data probe 10. The degree of deformation, degree of blockage, and degree of corrosion for air data probe 10 is then stored in physical degradation repository 116. Then, PHM analytics module 114 collects data from probe database 62, flight tracker 110, climate or weather database 112, and physical degradation repository 116 to calculate the remaining useful life for air data probe 10. System 28 then displays the remaining useful life either on display 44 of portable electronic device 30 or display 88 on augmented display eyewear device 80. Then, PHM analytics module 114 collects the time until the next scheduled maintenance for air data probe 10 and calculates if the remaining useful life of air data probe 10 is longer than the time until the next scheduled maintenance. If the remaining useful life of air data probe 10 is less than the time until the next scheduled maintenance, PHM analytics module will generate a warning and communicate that warning to portable electronic device 30. System 28 will then display the maintenance suggested warning on display 44 of portable electronic device 30 or display 88 of augmented display eyewear device 80.

Discussion of Possible Embodiments

The following are non-exclusive descriptions of possible embodiments of the present invention.

In one example, a method of inspecting an air data probe for damage or misalignment on a mounting surface includes retrieving reference data for the air data probe from a database. The method further includes capturing images of the air data probe via a camera and generating dimensions from the captured images of the air data probe via a feature extractor. An alignment calculator analyzes the generated dimensions from the captured images of the air data probe and the reference data for the air data probe from the database to identify misalignment of the air data probe. The alignment calculator also analyzes the generated dimensions from the captured images of the air data probe and the reference data for the air data probe from the database to identify damage of the air data probe. A maintenance recommendation for the air data probe is generated, based on the identified misalignment of the air data probe, or the identified damage of the air data probe. The method further includes outputting the maintenance recommendation.

The method of the preceding paragraph can optionally include, additionally and/or alternatively, any one or more of the following features, configurations and/or additional components:

a base connected to the mounting surface; a strut, wherein the strut extends radially outward from the base, and a multi-function tube having a barrel portion extending forward from a forward tip to an aft end of the multi-function tube, wherein the aft end of the multi-function tube extends from the strut, wherein the dimensions are generated from at least three points on the air data probe, the at least three points including a first data point at the tip of the multi-function tube, and a second data point and a third data point at pre-selected positions on the mounting surface, and wherein the reference data includes data ideal dimensions based on an ideal position of the first data point relative the pre-selected positions of the second data point and the third data point on the mounting surface;

wherein the alignment calculator further includes: comparing via the alignment calculator variances between the position of the first data point and the ideal position of the first data point; and referencing a set of tolerances stored in the reference data to determine whether the air data probe is misaligned or damaged;

wherein the air data probe includes: a base connected to the mounting surface; a strut, wherein the strut extends outward from the base; and a multi-function tube having a barrel portion extending from a forward tip to an aft end of the multi-function tube, wherein the aft end of the multi-function tube extends from the strut, wherein the dimensions are generated from comparing the reference data of the stored image with the captured images of the air data probe across a plurality of data points;

wherein the alignment calculator further includes: calculating variances between the reference data of the stored image and the generated dimensions; and comparing the calculated variances to stored tolerances to determine whether the air data probe is misaligned or damaged;

further includes: providing into a device an identification of an aircraft; and providing into the device an identification of the air data probe, wherein the device comprises the camera, the feature extractor, and the alignment calculator;

further includes: capturing an image of the air data probe; identifying the air data probe and retrieving the air data probe part number; evaluating that the air data probe part number is compatible with the aircraft type; generating an incorrect air data probe warning if the air data probe part number is not proper for the aircraft type; outputting the incorrect air data probe warning; and displaying incorrect air data probe warning on the display of the device;

further including: capturing an image of the air data probe; identifying the air data probe and retrieving the air data probe part number; evaluating that the air data probe part number is compatible with the aircraft type; generating a correct air data probe warning if the air data probe part number is proper for the aircraft type; and displaying the correct air data probe warning on the display of the device;

further including: analyzing, via a sensor within the handheld portable device the position of the handheld portable device relative to the air data probe, wherein the position of the handheld portable electronic device relative to the air data probe is communicated to the alignment calculator, and wherein, the alignment calculator uses the position of the handheld portable electronic device relative to the air data probe when identifying misalignment of the air data probe or when identifying damage to the air data probe;

wherein the air data probe includes: a base connected to the mounting surface; a strut, wherein the strut extends radially outward from the base; a multi-function tube having a barrel portion extending from a forward tip to an aft end of the multi-function tube, wherein the aft end of the multi-function tube extends from the strut; and at least one pressure port aft of the forward tip opposite of one another on the barrel portion of the multi-function tube, wherein the dimensions are generated from an outer profile of the at least one pressure port and an inner profile of the at least one pressure port, and wherein the reference data includes ideal dimensions based on an ideal outer profile of the at least one pressure port and an ideal inner profile at least one pressure port; and/or further comprising: analyzing the captured images of the air data probe for physical degradation using a physical degradation analysis module, wherein the physical degradation analysis module determines a degree of corrosion by detecting a magnitude of change in a contrast on the air data probe, a degree of physical deformation by comparing the outer profile of the at least one pressure port of the captured image and the ideal outer profile of the at least one pressure port, and a degree of blockage in the air data probe by comparing the inner profile of the at least one pressure port of the captured image and the ideal inner profile of the pitot pressure port and the at least two static pressure ports to determine the physical degradation of the air data probe; retrieving via a prognostic health monitoring analytics module flight profile information from a flight tracker, climate information from a climate database, and physical degradation history for the air data probe form a physical degradation repository; calculating a remaining useful life of the air data probe by the prognostic health monitoring analytics module using the flight profile information, the climate information, and the physical degradation history; generating a maintenance suggestion if the remaining useful life of the air data probe is less than a time until a next scheduled maintenance; and displaying the maintenance suggestion on the display of the portable electronic device.

In another example, a method of inspecting an air data probe for damage or misalignment on a mounting surface includes retrieving reference data for the air data probe from a database, capturing images of the air data probe via a camera, and generating dimensions from the captured images of the air data probe via the feature extractor. The method further includes, comparing with an alignment calculator the generated dimensions from the captured images of the air data probe and the reference data for the air data probe from the database to identify misalignment of the air data probe. The alignment calculator compares the generated dimensions from the captured images of the air data probe and the reference data for the air data probe from the database to identify damage of the air data probe. A maintenance recommendation is generated based on the identified misalignment of the air data probe, or the identified damage of the air data probe, and the maintenance recommendation is outputted.

The method of the preceding paragraph can optionally include, additionally and/or alternatively, any one or more of the following features, configurations and/or additional components:

Wherein the air data probe includes: a base connected to the mounting surface; a strut, wherein the strut extends from the base; and a multi-function tube having a barrel portion extending from a forward tip to an aft end of the multi-function tube, wherein the aft end of the multi-function tube extends from the strut, wherein the dimensions are generated from at least three points on the air data probe, the at least three data points include a first data point at the tip of the multi-function tube, and a second data point and a third data point at pre-selected positions on the mounting surface, and wherein the reference data includes ideal dimensions based on an ideal position of the first data point relative the pre-selected positions of the second data point and the third data point on the mounting surface;

further including: providing into a device an identification of an aircraft; and providing into the device an identification of the air data probe, wherein the device includes the camera, the feature extractor, and the alignment calculator;

wherein the device is a handheld portable electronic device, and the images captured by the handheld portable electronic device are videos; and/or further includes an augmented display eyewear device, wherein the augmented display eyewear device is in wireless communication with the handheld portable electronic device.

In another example, a system for inspecting an air data probe for physical damage or misalignment on a mounting surface includes an image sensor, a display device, one or more processors, and computer-readable memory. The computer-readable memory is encoded with instructions that, when executed by the one or more processors, cause the system to retrieve reference data for the air data probe from a database, retrieve reference data for the air data probe from a database, and capture images of the air data probe via the image sensor. The instructions further cause the system to generate dimensions from the captured images of the air data probe via a feature extractor. An alignment calculator compares the generated dimensions from the captured images of the air data probe and the reference data for the air data probe from the database to identify misalignment of the air data probe on the mounting surface. The instructions further cause the system to compare with the alignment calculator the generated dimensions from the captured images of the air data probe and the reference data for the air data probe from the database to identify damage of the air data probe. The system generates, based on the identified misalignment of the air data probe, or the identified damage of the air data probe a maintenance recommendation for the air data probe, and output the maintenance recommendation onto the display.

The system of the preceding paragraph can optionally include, additionally and/or alternatively, any one or more of the following features, configurations and/or additional components:

further including a handheld portable electronic device, wherein the handheld portable electronic device includes the image sensor, the display device, the one or more processors, and the computer-readable memory:

further including: an external computing infrastructure wirelessly connected to the portable handheld device, wherein the external computing infrastructure includes: a probe type identifier, wherein the probe type identifier is configured to analyze and identify the air data probe and verify that the air data probe is compatible with the aircraft on which the air data probe is installed; the feature extractor; the alignment calculator; and computer-readable memory encoded with instructions that, when executed by the one or more processors cause the system to: retrieve the reference data for the air data probe from the database; capture images of the air data probe via the image sensor; generate dimensions from the captured images of the air data probe via the feature extractor; compare with the alignment calculator the generated dimensions from the captured images of the air data probe and the reference data for the air data probe from the database to identify misalignment of the air data probe; compare with alignment calculator the generated dimensions from the captured images of the air data probe and the reference data for the air data probe from the database to identify damage of the air data probe; generate, based on the identified misalignment of the air data probe, or the identified damage of the air data probe a maintenance recommendation for the air data probe; and outputting the maintenance recommendation wirelessly to the handheld portable electronic device; and/or further including: an augmented display eyewear device, wherein the augmented display eyewear device wirelessly communicates with the handheld portable electronic device, and wherein the handheld portable electronic device outputs the maintenance recommendation to the augmented display eyewear device, and the maintenance recommendation is displayed on the display of the augmented display eyewear device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, the aircraft maintenance crew, or the flight crew could routinely take images or videos of air data probe 10 during their routine pre-flight checks. These images can be communicated to system 28, and system 28 can proactively determine whether air data probe 10 is misaligned, damaged, or degraded past a suggested operable life and proactively provide reports of suggested maintenance warnings to the aircraft maintenance team. Therefore, it is intended that the invention not be limited to the particular embodiment(s) disclosed, but that the invention will include all embodiments falling within the scope of the appended claims.

The invention claimed is:

1. A method of inspecting an air data probe for damage, degradation, or misalignment on a mounting surface, the method comprising:
    providing into a device an identification of an aircraft;
    providing into the device an identification of the air data probe, wherein the device comprises a camera, a feature extractor, and an alignment calculator;
    retrieving reference data for the air data probe from a database;
    capturing images of the air data probe via the camera;
    generating dimensions from the captured images of the air data probe via the feature extractor;
    analyzing with the alignment calculator the generated dimensions from the captured images of the air data probe and the reference data for the air data probe from the database to identify misalignment of the air data probe;
    analyzing with the alignment calculator the generated dimensions from the captured images of the air data probe and the reference data for the air data probe from the database to identify damage of the air data probe;
    generating, based on the identified misalignment of the air data probe, or the identified damage of the air data probe, a maintenance recommendation for the air data probe; and
    outputting the maintenance recommendation.

2. The method of claim 1, further comprising:
    capturing an image of the air data probe;
    identifying the air data probe and retrieving the air data probe part number;
    evaluating that the air data probe part number is compatible with the aircraft type;
    generating an incorrect air data probe warning if the air data probe part number is not proper for the aircraft type;
    outputting the incorrect air data probe warning; and
    displaying incorrect air data probe warning and the maintenance recommendation on a display of the device.

3. The method of claim 1, further comprising:
    capturing an image of the air data probe;
    identifying the air data probe and retrieving the air data probe part number;
    evaluating that the air data probe part number is compatible with the aircraft type;
    generating a correct air data probe warning if the air data probe part number is proper for the aircraft type;
    outputting the correct air data probe warning; and displaying the correct air data probe warning on a display of the device.

4. The method of claim 3, further comprising:
analyzing, via a sensor within the device, wherein the device is a handheld portable electronic device, the position of the handheld portable electronic device relative to the air data probe, wherein the position of the handheld portable electronic device relative to the air data probe is communicated to the alignment calculator, and wherein the alignment calculator uses the position of the handheld portable electronic device relative to the air data probe when identifying misalignment of the air data probe or when identifying damage to the air data probe.

5. A method of inspecting an air data probe for damage, degradation, or misalignment on a mounting surface, the method comprising:
retrieving reference data for the air data probe from a database;
capturing images of the air data probe via a camera;
generating dimensions from the captured images of the air data probe via a feature extractor;
analyzing with an alignment calculator the generated dimensions from the captured images of the air data probe and the reference data for the air data probe from the database to identify misalignment of the air data probe;
analyzing with an alignment calculator the generated dimensions from the captured images of the air data probe and the reference data for the air data probe from the database to identify damage of the air data probe;
generating, based on the identified misalignment of the air data probe, or the identified damage of the air data probe, a maintenance recommendation for the air data probe; and
outputting the maintenance recommendation;
wherein the air data probe comprises:
a base connected to the mounting surface;
a strut, wherein the strut extends radially outward from the base; and
a multi-function tube having a barrel portion extending from a forward tip to an aft end of the multi-function tube, wherein the aft end of the multi-function tube extends from the strut,
wherein the dimensions are generated from at least three points on the air data probe, the at least three points comprising a first data point at the tip of the multi-function tube, and a second data point and a third data point at pre-selected positions on the mounting surface, and
wherein the reference data includes ideal dimensions based on an ideal position of the first data point relative the pre-selected positions of the second data point and the third data point on the mounting surface.

6. The method of claim 5, wherein the alignment calculator further comprises:
comparing via the alignment calculator the dimensions with the ideal dimensions of the reference data;
calculating via the alignment calculator variances between the position of the first data point and the ideal position of the first data point; and
referencing a set of tolerances stored in the reference data to determine whether the air data probe is misaligned or damaged.

7. A method of inspecting an air data probe for damage, degradation, or misalignment on a mounting surface, the method comprising:
retrieving reference data for the air data probe from a database;
capturing images of the air data probe via a camera;
generating dimensions from the captured images of the air data probe via a feature extractor;
analyzing with an alignment calculator the generated dimensions from the captured images of the air data probe and the reference data for the air data probe from the database to identify misalignment of the air data probe;
analyzing with an alignment calculator the generated dimensions from the captured images of the air data probe and the reference data for the air data probe from the database to identify damage of the air data probe;
generating, based on the identified misalignment of the air data probe, or the identified damage of the air data probe, a maintenance recommendation for the air data probe; and
outputting the maintenance recommendation;
wherein the air data probe comprises:
a base connected to the mounting surface;
a strut, wherein the strut extends outward from the base; and
a multi-function tube having a barrel portion extending from a forward tip to an aft end of the multi-function tube, wherein the aft end of the multi-function tube extends from the strut,
wherein the dimensions are generated from comparing the reference data of the stored image with the captured images of the air data probe across a plurality of data points.

8. The method of claim 7, wherein the alignment calculator further comprises:
calculating variances between the reference data of the stored image and the generated dimensions; and
comparing the calculated variances to stored tolerances to determine whether the air data probe is misaligned or damaged.

9. A method of inspecting an air data probe for damage, degradation, or misalignment on a mounting surface, the method comprising:
retrieving reference data for the air data probe from a database;
capturing images of the air data probe via a camera;
generating dimensions from the captured images of the air data probe via a feature extractor;
analyzing with an alignment calculator the generated dimensions from the captured images of the air data probe and the reference data for the air data probe from the database to identify misalignment of the air data probe;
analyzing with an alignment calculator the generated dimensions from the captured images of the air data probe and the reference data for the air data probe from the database to identify damage of the air data probe;
generating, based on the identified misalignment of the air data probe, or the identified damage of the air data probe, a maintenance recommendation for the air data probe; and
outputting the maintenance recommendation;
wherein the air data probe comprises:
a base connected to the mounting surface;
a strut, wherein the strut extends radially outward from the base;

a multi-function tube having a barrel portion extending from a forward tip to an aft end of the multi-function tube, wherein the aft end of the multi-function tube extends from the strut; and at least one pressure port aft of the forward tip opposite of one another on the barrel portion of the multi-function tube, wherein the dimensions are generated from an outer profile of the at least one pressure port and an inner profile of the at least one pressure port, and wherein the reference data includes ideal dimensions based on an ideal outer profile of the at least one pressure port and an ideal inner profile at least one pressure port.

10. A method of inspecting an air data probe for damage, degradation, or misalignment on a mounting surface, the method comprising:

retrieving reference data for the air data probe from a database;

capturing images of the air data probe via a camera;

generating dimensions from the captured images of the air data probe via a feature extractor;

analyzing with an alignment calculator the generated dimensions from the captured images of the air data probe and the reference data for the air data probe from the database to identify misalignment of the air data probe;

analyzing with an alignment calculator the generated dimensions from the captured images of the air data probe and the reference data for the air data probe from the database to identify damage of the air data probe;

generating, based on the identified misalignment of the air data probe, or the identified damage of the air data probe, a maintenance recommendation for the air data probe;

outputting the maintenance recommendation;

analyzing the captured images of the air data probe for physical degradation using a physical degradation analysis module, wherein the physical degradation analysis module determines a degree of corrosion by detecting a magnitude of change in a contrast on the air data probe, a degree of physical deformation by comparing the outer profile of the at least one pressure port of the captured image and the ideal outer profile of the at least one pressure port, and a degree of blockage in the air data probe by comparing the inner profile of the at least one pressure port of the captured image and the ideal inner profile of the pitot pressure port and the at least two static pressure ports to determine the physical degradation of the air data probe;

retrieving via a prognostic health monitoring analytics module flight profile information from a flight tracker, climate information from a climate database, and physical degradation history for the air data probe form a physical degradation repository;

calculating a remaining useful life of the air data probe by the prognostic health monitoring analytics module using the flight profile information, the climate information, and the physical degradation history;

generating a maintenance suggestion if the remaining useful life of the air data probe is less than a time until a next scheduled maintenance; and displaying the maintenance suggestion on the display of the portable electronic device.

11. A method of inspecting an air data probe for damage or misalignment on a mounting surface, the method comprising:

providing into a device an identification of an aircraft;

providing into the device an identification of the air data probe, wherein the device comprises a camera, a feature calculator, and an alignment calculator;

retrieving reference data for the air data probe from a database;

capturing images of the air data probe via the camera;

generating dimensions from the captured images of the air data probe via the feature extractor;

comparing with the alignment calculator the generated dimensions from the captured images of the air data probe and the reference data for the air data probe from the database to identify misalignment of the air data probe;

comparing with the alignment calculator the generated dimensions from the captured images of the air data probe and the reference data for the air data probe from the database to identify damage of the air data probe;

generating, based on the identified misalignment of the air data probe, or the identified damage of the air data probe, a maintenance recommendation for the air data probe; and outputting the maintenance recommendation.

12. The method of claim 11, wherein the device is a handheld portable electronic device, and the images captured by the handheld portable electronic device are videos.

13. The method of claim 12, further comprising an augmented display eyewear device, wherein the augmented display eyewear device is in wireless communication with the handheld portable electronic device.

14. A method of inspecting an air data probe for damage or misalignment on a mounting surface, the method comprising:

retrieving reference data for the air data probe from a database;

capturing images of the air data probe via a camera;

generating dimensions from the captured images of the air data probe via a feature extractor;

comparing with an alignment calculator the generated dimensions from the captured images of the air data probe and the reference data for the air data probe from the database to identify misalignment of the air data probe;

comparing with an alignment calculator the generated dimensions from the captured images of the air data probe and the reference data for the air data probe from the database to identify damage of the air data probe;

generating, based on the identified misalignment of the air data probe, or the identified damage of the air data probe, a maintenance recommendation for the air data probe; and outputting the maintenance recommendation;

wherein the air data probe comprises:
  a base connected to the mounting surface;
  a strut, wherein the strut extends from the base; and
  a multi-function tube having a barrel portion extending from a forward tip to an aft end of the multi-function tube, wherein the aft end of the multi-function tube extends from the strut, wherein the dimensions are generated from at least three points on the air data probe, the at least three points comprising a first data point at the tip of the multi-function tube, and a second data point and a third data point at pre-selected positions on the mounting surface, and wherein the reference data includes ideal dimensions based on an ideal position of the first data point relative the pre-selected positions of the second data point and the third data point on the mounting surface.

15. A system for inspecting an air data probe for physical damage or misalignment on a mounting surface, the system comprising:
   an image sensor;
   a display device;
   one or more processors;
   computer-readable memory encoded with instructions that, when executed by the one or more processors cause the system to:
      identify an aircraft;
      identify the air data probe;
      retrieve reference data for the air data probe from a database;
      capture images of the air data probe via the image sensor;
      generate dimensions from the captured images of the air data probe via a feature extractor;
      compare with an alignment calculator the generated dimensions from the captured images of the air data probe and the reference data for the air data probe from the database to identify misalignment of the air data probe on the mounting surface;
      compare with an alignment calculator the generated dimensions from the captured images of the air data probe and the reference data for the air data probe from the database to identify damage of the air data probe;
      generate, based on the identified misalignment of the air data probe, or the identified damage of the air data probe a maintenance recommendation for the air data probe; and
      output the maintenance recommendation onto the display; and
   a device comprising the image sensor, the display device, the one or more processors, the computer-readable memory, the feature extractor, and the alignment calculator.

16. The system of claim 15, wherein the device is a handheld portable electronic device.

17. The system of claim 16, further comprising:
   an external computing infrastructure wirelessly connected to the handheld portable electronic device, wherein the external computing infrastructure comprises:
      a probe type identifier, wherein the probe type identifier is configured to analyze and identify the air data probe and verify that the air data probe is compatible with the aircraft on which the air data probe is installed;
      the feature extractor;
      the alignment calculator; and
      computer-readable memory encoded with instructions that, when executed by the one or more processors cause the system to:
         retrieve the reference data for the air data probe from the database;
         capture images of the air data probe via the image sensor;
         generate dimensions from the captured images of the air data probe via the feature extractor;
         compare with the alignment calculator the generated dimensions from the captured images of the air data probe and the reference data for the air data probe from the database to identify misalignment of the air data probe;
         compare with the alignment calculator the generated dimensions from the captured images of the air data probe and the reference data for the air data probe from the database to identify damage of the air data probe;
         generate, based on the identified misalignment of the air data probe, or the identified damage of the air data probe a maintenance recommendation for the air data probe; and
         outputting the maintenance recommendation wirelessly to the handheld portable electronic device.

18. The system of claim 17, further comprising:
   an augmented display eyewear device, wherein the augmented display eyewear device wirelessly communicates with the handheld portable electronic device, and wherein the handheld portable electronic device outputs the maintenance recommendation to the augmented display eyewear device, and the maintenance recommendation is displayed on the display of the augmented display eyewear device.

* * * * *